(12) United States Patent
Brandt et al.

(10) Patent No.: US 12,491,562 B2
(45) Date of Patent: Dec. 9, 2025

(54) LASER CENTER DEPENDENT EXPOSURE STRATEGY

(71) Applicant: EOS GmbH Electro Optical Systems, Krailling (DE)

(72) Inventors: Sarah Brandt, Munich (DE); Alexander Frey, Munich (DE)

(73) Assignee: EOS GmbH Electro Optical Systems, Krailling (DE)

( * ) Notice: Subject to any disclaimer, the term of this patent is extended or adjusted under 35 U.S.C. 154(b) by 626 days.

(21) Appl. No.: 17/798,961

(22) PCT Filed: Feb. 17, 2021

(86) PCT No.: PCT/EP2021/053864
§ 371 (c)(1),
(2) Date: Aug. 11, 2022

(87) PCT Pub. No.: WO2021/165305
PCT Pub. Date: Aug. 26, 2021

(65) Prior Publication Data
US 2023/0077127 A1    Mar. 9, 2023

(30) Foreign Application Priority Data

Feb. 18, 2020   (DE) .......................... 102020201995.9

(51) Int. Cl.
*B22F 10/366*   (2021.01)
*B22F 10/28*   (2021.01)
(Continued)

(52) U.S. Cl.
CPC ............ *B22F 10/366* (2021.01); *B22F 10/28* (2021.01); *B22F 10/85* (2021.01); *B22F 12/49* (2021.01);
(Continued)

(58) Field of Classification Search
CPC ........ B22F 10/366; B22F 10/28; B22F 10/85; B22F 12/49; B22F 2999/00; B22F 10/322;
(Continued)

(56) References Cited

U.S. PATENT DOCUMENTS

2004/0094728 A1   5/2004   Herzog et al.
2016/0279706 A1   9/2016   Domrose et al.
(Continued)

FOREIGN PATENT DOCUMENTS

CN   105431279 A   3/2016
CN   110462535 A   11/2019
(Continued)

OTHER PUBLICATIONS

International Search Report for PCT Application No. PCT/EP2021/053864, dated Apr. 15, 2021, 5 pages.

*Primary Examiner* — Rebecca Janssen
(74) *Attorney, Agent, or Firm* — Polsinelli PC

(57) ABSTRACT

Disclosed is a method for controlling an energy input device of an additive manufacturing device. A beam bundle deflection center is assigned to each of the number of beam bundles from which this beam bundle is directed onto the build plane. Each beam bundle deflection center is assigned a projection center corresponding to a perpendicular projection of the position of the beam bundle deflection center onto the build plane. The directions of the movement vectors of the number of beam bundles when scanning the trajectories are defined such that at each of the solidification points in this section the movement vector has an angle with respect to a connection vector from this solidification point to the projection center of the beam bundle used, which angle is smaller than a predetermined maximum angle γ1.

14 Claims, 13 Drawing Sheets

(51) Int. Cl.
*B22F 10/85* (2021.01)
*B22F 12/49* (2021.01)
*B33Y 10/00* (2015.01)
*B33Y 30/00* (2015.01)
*B33Y 50/02* (2015.01)

(52) U.S. Cl.
CPC ............... *B33Y 10/00* (2014.12); *B33Y 30/00* (2014.12); *B33Y 50/02* (2014.12)

(58) Field of Classification Search
CPC ......... B33Y 10/00; B33Y 30/00; B33Y 50/02; B33Y 80/00; Y02P 10/25; B29C 64/153; B29C 64/364; B29C 64/393
See application file for complete search history.

(56) References Cited

U.S. PATENT DOCUMENTS

| | | |
|---|---|---|
| 2017/0072468 A1 | 3/2017 | Schilling et al. |
| 2017/0113410 A1 | 4/2017 | Fruth |
| 2020/0033835 A1 | 1/2020 | Heikkinen et al. |
| 2021/0122117 A1 | 4/2021 | Schade et al. |
| 2021/0129226 A1 | 5/2021 | Ploshikhin |
| 2021/0283851 A1* | 9/2021 | Hümmeler ............... B22F 12/70 |

FOREIGN PATENT DOCUMENTS

| | | | |
|---|---|---|---|
| DE | 10053742 | 5/2002 | |
| DE | 2014209161 | 11/2015 | |
| DE | 2015118162 | 4/2017 | |
| DE | 2017107364 | 10/2018 | |
| DE | 2017206792 | 10/2018 | |
| DE | 2017207256 | 10/2018 | |
| DE | 102017207256 A1 * | 10/2018 | ............... B22F 10/28 |
| WO | 2014125280 | 8/2014 | |
| WO | 2014176536 | 10/2014 | |

* cited by examiner

LASER CENTER DEPENDENT EXPOSURE STRATEGY

TECHNICAL FIELD OF THE INVENTION

The present invention relates to a method for controlling an energy input device of an additive manufacturing device, a correspondingly adapted additive manufacturing method, a respective device for controlling an energy input device of an additive manufacturing device, a correspondingly adapted additive manufacturing device and an object produced by the correspondingly adapted additive manufacturing method.

BACKGROUND OF THE INVENTION

Additive manufacturing devices and associated methods to which the invention relates are generally characterized in that they fabricate objects layer by layer by solidifying a shapeless building material (for example, a metal powder or plastic powder). The solidification can be effected, for example, by supplying thermal energy to the building material by irradiating it with electromagnetic radiation or particle radiation (for example laser sintering (SLS or DMLS) or laser melting or electron beam melting). For example, in laser sintering or laser melting, a laser beam is moved across those points of a layer of the building material that correspond to the object cross-section of the object to be produced in this layer, so that the building material is solidified at these points. After the building material has been melted or sintered at one point by the supply of thermal energy, the building material is no longer in a shapeless state after cooling, but is present as a solid body. After all points of an object cross-section to be solidified have been scanned, a new layer of the building material is applied and also solidified at the points corresponding to the cross-section of the object in this layer.

In particular when processing metal powder as a building material, impurities (for example, metal vapors, smoke or spatter) occur during the melting process, which are deposited on the layer to be solidified or interfere with the supply of radiation. Such impurities are undesirable because they can lead, for example, to undesirable distribution of the mechanical properties of the objects produced. In the prior art, attempts are therefore made to minimize the influence of these impurities on the properties of a manufactured object by passing a gas flow across the point to be solidified during the scanning process.

WO 2014/125280 A2 proposes matching the movement direction of the beam bundle to the direction of the gas flow when scanning the layer in order to achieve object properties that are as homogeneous as possible. Although such a procedure already improves the properties of the object, the procedure described is still in need of improvement, since on the one hand the coordination of the movement of the beam bundle and the direction of the gas flow sometimes complicates the manufacturing process and on the other hand, inhomogeneities of the object properties were still observed, especially in the case of extensive build areas.

SUMMARY OF THE INVENTION

It is therefore an object of the present invention to provide a method and a device for controlling an energy input device of an additive manufacturing device, by means of which an improved homogeneity of the properties of additively manufactured objects can be achieved.

Additive manufacturing devices and methods to which the present invention relates are in particular those in which energy in the form of electromagnetic radiation or particle radiation is selectively supplied to a layer of a shapeless building material. The working plane (also referred to as the build plane) is a plane in which the upper side of the layer to which the energy is supplied is located. In this case, the energy input device can comprise a laser or an electron beam source, for example. The radiation supplied to the building material heats up the building material and thus causes a sintering or melting process. In particular, the present invention relates to laser sintering, laser melting and electron beam melting devices and the associated methods. Although the invention can be applied both in connection with plastic-based building material and in connection with metal-based building material, application of the invention in connection with additive manufacturing methods and devices in which a metal or at least metal-containing building material is used, for example a metal powder or metal alloy powder, is of particular advantage.

It should be noted at this point that, by means of an additive manufacturing device according to the invention, not only one object but also several objects can be manufactured at the same time. If the manufacture of an object is mentioned in the present application, then it goes without saying that the respective description can also be applied in the same way to additive manufacturing methods and devices in which several objects are produced simultaneously.

Here the term "beam bundle" is used instead of "beam" to express that the diameter of the beam does not necessarily have to be very small, especially when the radiation impinges on the building material at an angle, or else when using radiation which deliberately is to cover a larger surface area when impinging on the building material.

A beam bundle deflection center can be, for example, a scanner with one or more galvanometer mirrors for deflecting a laser beam. It is also possible for several different beam bundles to be assigned to one and the same beam bundle deflection center or scanner, which, for example, are directed alternately from this beam bundle deflection center onto the build plane, although normally one beam bundle deflection center is assigned exactly one beam bundle to be directed onto the build plane. It should be noted at this point that in the present application the term "number" is always to be understood in the sense of "one or more". For a projection of the position of the beam bundle deflection center onto the build plane, a perpendicular to the build plane can be established, for example, which goes through a point of the beam bundle deflection center from which the beam bundle directed from the beam bundle deflection center onto the build plane originates. The projection center is then that place in the build plane where the perpendicular was erected. It should be mentioned that in the case of several beam bundles associated with a beam bundle deflection center, any differences in the position of the points at which the beam bundles originate are negligible.

In the method according to the invention, for the manufacture of at least a number of cross-sections of the object, preferably for the manufacture of the entire object, the energy input device is controlled in each case based on a data model of an object cross-section in such a way that the energy necessary for a solidification of the building material is supplied to the points to be solidified and that correspond to the object cross-section by the energy input device. In particular, the chronological order in which the points are to be solidified, i.e. a scan line or a trajectory in the build plane along which the beam bundle is to be moved, is specified and the number of beam bundle deflection centers is controlled accordingly for moving the beam bundles assigned to them.

A trajectory of a beam bundle specified for the control of the energy input device corresponds to a solidification path in the build plane along which the building material is to be solidified by shifting the melt pool in a direction substantially parallel to the build plane. In doing so, the beam bundle supplies so much energy to the, preferably powdery or pasty, building material at a solidification point that the building material sinters or completely melts at this point as a result of exceeding a melting temperature, i.e. a solidus and/or liquidus temperature, so that afterwards it is no longer present in the shapeless state in the cooled state, but is present as a solid body. Solidification paths are therefore areas in which during scanning of the building material by the at least one beam bundle a solidification of the building material is actually effected, and not merely heating. A solidification path can, for example, be a straight line of a certain width, but there are also cases in which one or more changes in direction take place when moving a beam bundle along the solidification path, in particular the solidification path is present geometrically as a curved line of a certain width. When reference is made to scanning with a beam bundle in the present application this always refers to the impact of the beam bundle on the building material which causes at least an uppermost layer of the building material to solidify, i.e. that does merely preheat or postheat the building material.

When an angle between two vectors is mentioned in this application, this always means an angle between the directions of the two vectors the value of which is less than or equal to 180°.

A section of an object cross-section referred to in the invention needs not necessarily refer to only a sub-area of an object cross-section or a single object cross-section, but can also include the entire object to be manufactured.

In a method according to the invention for controlling an energy input device of an additive manufacturing device for manufacturing a three-dimensional object using the same, the object is manufactured using the additive manufacturing device by applying a building material layer upon layer and solidifying the building material in a build plane using the energy input device by supplying radiant energy to solidification points in each layer that are associated with the cross-section of the object in this layer by scanning those solidification points with a number of beam bundles provided by the energy input device along a plurality of trajectories in the build plane, each of the number of beam bundles being assigned a beam bundle deflection center above the build plane from which this beam bundle is directed onto the build plane, wherein each beam deflection center is assigned a projection center which corresponds to a perpendicular projection of the position of the beam deflection center onto the build plane, wherein, at least in a section of an object cross-section, the directions of the movement vectors of the number of beam bundles during scanning of the trajectories are defined such that, at each of the solidification points in this section, the movement vector has an angle relative to a connection vector from this solidification point to the projection center of the beam bundle used, which angle is smaller than a predetermined maximum angle $\gamma 1$.

A connection vector from a solidification point to the projection center is here a vector directed towards the projection center along the shortest possible straight connection line between solidification point and projection center, the length of which corresponds to the distance between solidification point and projection center.

The method according to the invention makes it possible to additively manufacture objects with improved homogeneity. This applies not only to the homogeneity of the material properties within an object, but also with regard to the reproducibility of the properties from object to object when similar objects are produced simultaneously at different locations in the additive manufacturing device. The inventors explain this by the fact that during a manufacturing process the beam bundle almost always impinges on the build plane at an angle different from 90°. A perpendicular impingement of the beam bundle is actually only present in the projection center. According to the inventors' findings, an oblique impingement of the beam bundle can lead to a displacement of building material at the solidification point. Thus, the inventors observed that the more pronounced the movement of the beam bundle away from the projection center, the more building material is displaced in the case of an obliquely impinging beam bundle. A displacement of building material thus causes the solidified material volume to fluctuate, resulting in an inhomogeneity of the mechanical properties. Avoiding directions of movement of the beam bundle that substantially point away from the projection center therefore provides advantages. In particular, these advantages arise regardless of the respective orientation of a gas flow across the build area with respect to the movement vector of a beam bundle.

It should be noted that it is also possible to define different values for the maximum angle $\gamma 1$ for movement vectors that are located on different sides of the connection vector.

Preferably, the predetermined maximum angle $\gamma 1$ has a value that is smaller than or equal to 135°, preferably, smaller than or equal to 90°.

To achieve good results, a maximum angle of 90° is preferably selected. However, satisfactory results can still be obtained with a maximum angle between 90° and 135°. The smaller the maximum angle, the better results can be achieved. Therefore, depending on the quality requirements, a maximum angle of 75°, 60°, 45°, etc. can also be selected.

Further preferably, different maximum angles $\gamma 1$ are defined for different values of a beam bundle deflection angle $\alpha$, wherein a beam bundle deflection angle is defined as the arctangent of the quotient of the distance between the solidification point and the projection center and the length of the projection line of the beam bundle deflection center, wherein the projection line of the beam bundle deflection center is a perpendicular to the build plane connecting the projection center to the beam bundle deflection center.

A beam bundle deflection angle $\alpha$ is defined here as the angle between the propagation direction of the beam bundle and the perpendicular to the build plane. The more oblique the beam bundle impinges on the build plane, i.e. the larger the beam bundle deflection angle $\alpha$, the more pronounced will be the effects when the beam bundle impinges on the building material (in particular a material displacement) and the smaller should be chosen the maximum angle $\gamma 1$. Therefore, it brings advantages to take a smaller maximum angle $\gamma 1$ as a basis in regions that are further away from the projection center of a beam bundle deflection center. In doing so, it is already advantageous if at least two different values of the maximum angle $\gamma 1$ are taken as a basis, wherein, of course, a gradation with three, four or five different values of the maximum angle γ1 depending on the beam bundle deflection angle α leads to even better results.

Further preferably, in the method it is specified that at least two adjacent trajectories are scanned in the same or different direction, and different beam bundles are used to scan adjacent trajectories.

The advantage of this approach is in particular apparent when the different beam bundles are assigned to different beam bundle deflection centers. Then a scanning process can proceed more quickly because, notwithstanding the time advantage of a simultaneous scanning of different points of the object cross-section, for each solidification point always that beam bundle can be selected for scanning which, as a result of the position of the associated projection center, is favorably located for implementing the preferred exposure method. In particular, scanning of adjacent trajectories in alternating directions is then possible, wherein this can be carried out with an increased time offset if necessary.

It is possible, when manufacturing a three-dimensional object with the additive manufacturing device, to pass a gas flow across the respective solidification point during the scanning. In this case, preferably, in the at least one section of an object cross-section, the directions of the movement vectors of the number of beam bundles during the scanning of the trajectory are defined such that a directional component of the gas flow is opposite to the direction of the movement vectors of the number of beam bundles.

In particular, the angle between each of the movement vectors and the direction of the gas flow can be greater than 90°, preferably greater than 135°, more preferably greater than 150°. The optimal case would be if the direction of the gas flow were exactly opposite to that of the movement vectors.

As a result, it is possible to further improve the results achievable with the invention by additionally taking into account the orientation of the gas flow.

In another method according to the invention for controlling an energy input device of an additive manufacturing device for manufacturing a three-dimensional object using the same, the object is manufactured using the additive manufacturing device by applying a building material layer upon layer and solidifying the building material in a build plane using the energy input device by supplying radiant energy to solidification points in each layer that are associated with the cross-section of the object in this layer by scanning these solidification points with a number of beam bundles provided by the energy input device along a plurality of trajectories in the build plane, each of the number of beam bundles being assigned a beam bundle deflection center above the build plane from which the beam bundle is directed onto the build plane, wherein each beam bundle deflection center is assigned a projection center which corresponds to a perpendicular projection of the position of the beam bundle deflection center onto the build plane, wherein at least one section of an object cross-section is solidified, sub-area by sub-area, wherein in at least one of the sub-areas, the solidification points of which are scanned with a beam bundle assigned to this sub-area, the order of scanning of the trajectories is defined such that trajectories located closer to the projection center of the beam bundle are scanned before trajectories located further away from the projection center.

In principle, the mentioned sub-areas can have any shape. Preferably, a rectangular or square shape is chosen, since then the trajectories in a sub-area are often of the same length or substantially the same length, which can achieve better homogeneity during solidification. Two trajectories are substantially parallel if they are parallel to each other over at least 80%, preferably at least 95%, of the length of the shorter of the two.

Provided that the same procedure for determining their spatial distance from the projection center is used for all trajectories present in a sub-area, there are no restrictions on how the distance is to be determined. For example, an average of the distances of all points on a trajectory to the projection center can be defined as the distance of the trajectory from the projection center. However, it would also be possible, for example, to define in each case the minimum of the distances of all points on a trajectory from the projection center as the distance of the trajectory from the projection center.

In the method according to the invention, which can lead to additively manufactured objects with improved homogeneity, the advantageousness results from the fact that a non-isotropic deposition of material is taken into account in the case of an oblique impingement of a beam bundle on the build plane. In particular, when a beam bundle is incident at an angle, impurities (e.g., partially melted material) produced during the melting process are preferably deposited in the build plane towards the projection center. If trajectories that have a smaller distance to the projection center are scanned before trajectories that have a larger distance to the projection center, this results in the trajectories being scanned in a sub-area, one after the other starting with the one that is located closest to the projection center and ending with the one furthest away from the projection center. This results in impurities arising during the scanning of a trajectory always being deposited on already solidified building material (towards the projection center). This results in an improved homogeneity of the solidified object, since the impurities cannot interfere with the solidification process of the subsequent trajectory, as would be the case with the reverse scanning sequence. In particular, improved homogeneity results regardless of the respective orientation of a gas flow across the build area.

Preferably, in a sub-area in which the trajectories are substantially parallel to one another and the order of scanning the trajectories is defined such that trajectories located closer to the projection center of the beam bundle are scanned before trajectories located further away from the projection center, the directions of the movement vectors along the trajectories are defined in such a way that at each of the solidification points the movement vector has an angle relative to a connection vector from this solidification point to the projection center of the beam bundle used for this sub-area, which angle is smaller than a predetermined maximum angle γ1.

By the described procedure, the advantages of an advantageous choice of the direction of the movement vector when scanning the trajectories are combined with those in an advantageous choice of the scanning order of the trajectories, whereby even more homogeneous components can be obtained. To achieve good results, a maximum angle γ1 of 90° is preferably chosen. However, satisfactory results can still be obtained even with a maximum angle between 90° and 135°. The lower the maximum angle, the better results can be achieved. Therefore, depending on the quality requirements, a maximum angle of 75°, 60°, 45°, etc. can also be selected.

Further preferably, in order to determine the proximity of a trajectory to the projection center, for each of the trajectories a reference point connection vector is constructed from a reference point on the respective trajectory, preferably from a starting point of the respective trajectory, to the projection center, and the length of the component of the reference point connection vector which is perpendicular to the trajectory is determined, wherein it is defined that for each two trajectories for which the length of the component perpendicular to the trajectory differs, that trajectory is located closer to the projection center of the beam bundle for which the length of the component perpendicular to the trajectory is smaller.

Here, a reference point on a trajectory is a point whose distances from the starting point and end point of the trajectory satisfy a predefined relationship. In particular, this can be the starting point or the end point of the trajectory, respectively. If adjacent trajectories are passed in opposite directions, the point that has the same distance to the starting point and to the end point can be defined as the reference point, for example. The described procedure for determining the distances of the trajectories from the projection center is particularly advantageous if the trajectories are not perpendicular to the connection vectors from the projection center to the respective starting points of the trajectories.

Further preferably, in a sub-area in which the trajectories are substantially parallel to one another and the order of scanning of the trajectories is defined such that trajectories which are located closer to the projection center of the beam bundle are scanned before trajectories which are located further away from the projection center, the movement vector at at least one solidification point has an angle with respect to a connection vector from this solidification point to the projection center of the beam bundle used, which angle is greater than a predetermined minimum angle $\gamma 2$.

When the movement vector of the beam bundle when scanning the trajectories has a small angle with respect to the connection vector of a solidification point on the trajectory to the projection center, then, when the beam bundle obliquely impinges on the build plane, the impurities are approximately deposited along the trajectory itself. An impairment of neighboring trajectories is then not so great. Therefore, it is useful to define a minimum angle $\gamma 2$ and to specify a certain order of scanning the trajectories only when this minimum angle is exceeded. Preferably, a value of 45° can be chosen for the minimum angle, even more preferably a value of 60°, still further preferably a value of 75°.

It should also be noted that it is also possible to specify different values for the minimum angle $\gamma 2$ for movement vectors that lie on different sides of the connection vector.

Preferably, different minimum angles $\gamma 2$ are defined for different values of a beam bundle deflection angle $\alpha$, wherein a beam bundle deflection angle is defined as the arctangent of the quotient of the distance of the solidification point from the projection center and the length of the projection line of the beam bundle deflection center, the projection line of the beam bundle deflection center being a perpendicular to the build plane connecting the projection center to the beam bundle deflection center.

The more oblique the beam bundle impinges on the build plane, the more pronounced will be the deposition of impurities in a preferential direction. Therefore, there are advantages in taking a lower minimum angle $\gamma 2$ as a basis in regions that are further away from the projection center of a beam bundle deflection center. Here, it is already advantageous if at least two different values of the minimum angle $\gamma 2$ are taken as a basis.

It is possible, when manufacturing a three-dimensional object with the additive manufacturing device, to pass a gas flow across the respective solidification point during scanning. In this case, a beam bundle deflection center for which a directional component of the gas flow points from the solidification points to the projection center associated with the beam bundle deflection center is preferably selected for scanning the solidification points in the at least one of the sub-areas.

In particular, in doing so, the angle between the direction of the gas flow and the connection line between the solidification point and the projection center can be selected to be smaller than 90°, preferably smaller than 45°, more preferably smaller than 30°. The optimal case would be when the gas flow points exactly towards the projection center.

As a result, it is possible to further improve the results achievable with the invention by additionally taking into account the orientation of the gas flow.

According to the invention, in a further method for controlling an energy input device of an additive manufacturing device for manufacturing a three-dimensional object using the same, the object is manufactured using the additive manufacturing device by applying a building material layer upon layer and solidifying the building material in a build plane using the energy input device by supplying radiant energy to solidification points in each layer which are assigned to the cross-section of the object in this layer, by scanning these solidification points with a number of beam bundles provided by the energy input device along a plurality of trajectories in the build plane, wherein each of the number of beam bundles is assigned a beam bundle deflection center above the build plane, from which the beam bundle is directed onto the build plane, wherein each beam bundle deflection center is assigned a projection center that corresponds to a perpendicular projection of the position of the beam bundle deflection center onto the build plane, wherein at least one section of an object cross-section is solidified, sub-area by sub-area, wherein the chronological order of scanning of sub-areas, whose solidification points are scanned with a beam bundle assigned to these sub-areas, is defined such that sub-areas that are located closer to the projection center of the beam bundle are scanned before sub-areas that are located further away from the projection center.

In principle, the mentioned sub-areas can have any shape. Furthermore, the sub-areas can in principle have any shape and the areas of the different sub-areas can also be of different sizes. Furthermore, the building material within the sub-areas does not necessarily have to be solidified along rectilinear trajectories. It would also be conceivable to scan along a cycloidal trajectory (referred to as "wobbling" in technical jargon). However, if the trajectories in a sub-area are chosen to be substantially parallel and of substantially equal length, a rectangular or square shape of the sub-areas is preferably chosen at the same time. A substantially parallel course of two trajectories exists if they are parallel to each other over at least 80%, preferably at least 95%, of the length of the shorter of the two. In the case of a rectangular or square shape of the sub-areas, it is also particularly easy to cover a section of an object cross-section with sub-areas that adjoin one another without gaps.

Provided that the same procedure is used for all sub-areas to determine their spatial distance from the projection center, there are no restrictions on how the distance is to be determined. For example, an average of the distances of all points to be solidified within a sub-area from the projection center can be defined as the distance of the sub-area from the projection center. However, it would also be possible, for example, to define in each case the minimum of the distances of all points to be solidified within a sub-area from the projection center as the distance of the sub-area from the projection center.

In the process according to the invention, which can lead to additively manufactured objects with improved homogeneity, the advantageousness also results from the fact that a non-isotropic or spatially non-uniformly distributed deposition of impurities is taken into account in the case of oblique impingement of a beam bundle onto the build plane. As mentioned above, when a beam bundle is incident at an angle, the impurities are preferentially deposited towards the projection center in the build plane. If sub-areas to which the same beam bundle is assigned for a scanning are scanned in such a way that those sub-areas which have a smaller distance to the projection center of the beam bundle are scanned before sub-areas which have a larger distance to the projection center, this results in the sub-areas being scanned one after the other starting with the one located closest to the projection center and ending with the one furthest away from the projection center. As a result, impurities generated during the scanning of a sub-area are always deposited on already solidified building material (towards the projection center). This results in improved homogeneity of the solidified object, since the impurities cannot impair the solidification process of the subsequent sub-area, as would be the case if the scanning sequence were reversed. In particular, improved homogeneity results, regardless of the respective orientation of a gas flow across the build area.

Preferably, in the sub-areas for which the chronological order of scanning is defined, at each of the solidification points the movement vector has an angle with respect to a connection vector from this solidification point towards the projection center of the beam bundle used for this sub-area which angle is smaller than a predetermined maximum angle $\gamma 1$.

By the described procedure the advantages of an advantageous choice of the direction of the movement vector when scanning the trajectories are combined with those in an advantageous choice of the scanning sequence of the sub-areas, whereby even more homogeneous components can be obtained. To achieve good results, preferably a maximum angle $\gamma 1$ of 90° is chosen. However, satisfactory results can still be obtained even with a maximum angle between 90° and 135°. The lower the maximum angle, the better results can be achieved. Therefore, depending on the quality requirements, a maximum angle of 75°, 60°, 45°, etc. can also be selected.

Preferably, in at least one sub-area whose solidification points are scanned with a beam bundle associated with this sub-area, the order of scanning of the trajectories is defined in such a way that trajectories located closer to the projection center of the beam bundle are scanned before trajectories located further away from the projection center.

Provided that the same method for determining their spatial distance from the projection center is used for all trajectories present in a sub-area, there are no restrictions on how the distance is to be determined. For example, an average of the distances of all points on a trajectory to the projection center can be defined as the distance of the trajectory from the projection center. However, it would also be conceivable, for example, to define in each case the minimum of the distances of all points on a trajectory to the projection center as the distance of the trajectory from the projection center.

By the described procedure the advantages of an advantageous choice of the scanning sequence of the trajectories within a sub-area, preferably within each of the sub-areas, are combined with those in an advantageous choice of the scanning sequence of the sub-areas, whereby more homogeneous components can be obtained.

Further preferably, the minimum of the distances of the solidification points in the sub-area from the projection center is used as a measure for the distance of a sub-area from the projection center.

With the described definition of the distance of a sub-area from the projection center, a scanning sequence of the sub-areas can be defined in a simple way.

Further preferably, the section has a plurality of sub-areas that have a rectangular shape in a plan view of the build plane, the trajectories in the section being substantially parallel to one another and substantially parallel to the transverse sides of the sub-areas, wherein the length of a perpendicular from the projection center to a straight line extending through a sub-area parallel to a long side is used as a measure for the distance of a sub-area from the projection center.

With such a definition of the distance of a sub-area from the projection center, a scanning sequence can be determined in a defined manner, in particular for rectangular sub-areas located next to each other.

Further preferably, during the solidification of cross-sections of the object that are present in different layers, the long sides of the plurality of sub-areas in the different layers have an altered orientation in the build plane.

Changing the orientation of the sub-areas in the build plane from layer to layer can lead to a reduction in the anisotropy of the properties of the manufactured objects. The more frequently the sub-areas are rotated from layer to layer, the more isotropic properties in a plane parallel to the build plane are achievable. For example, if the orientation of the trajectories in the sub-areas is chosen so that the trajectories always intersect the long sides of the sub-areas at a specified angle, then a different orientation of the sub-areas from layer to layer also results in a different orientation of the trajectories within them from layer to layer. This may result in a different determination of the scanning sequence of the sub-areas from layer to layer and, in particular, in a different assignment of laser beam bundle deflection centers to sub-areas in order to provide for an optimized direction of the movement vectors and scanning sequences with respect to the respective projection center. In particular, a layer rotation angle $\delta$ by which the sub-areas are rotated from layer to layer can be defined as a function of a maximum angle $\gamma 1$ and/or minimum angle $\gamma 2$ predetermined for the sub-areas.

Further preferably, in each of the sub-areas for which the chronological order of scanning is defined, the movement vector at a solidification point has an angle with respect to a straight connection line from this solidification point to the projection center of the beam bundle used, which angle is greater than a predetermined minimum angle $\gamma 2$.

If the progress direction of the trajectories has a small angle with respect to the connection vector of a solidification point on the trajectory towards the projection center, then the impurities are deposited approximately along the trajectory itself if the beam bundle impinges obliquely on the build plane. An impairment of neighboring trajectories is then not so great. Therefore, it is useful to define a minimum angle $\gamma 2$ and to specify a certain order of scanning the sub-areas only when this minimum angle is exceeded. Preferably, a value of 45° can be selected for the minimum angle, even more preferably a value of 60°, still further preferably a value of 75°.

It is possible, when manufacturing a three-dimensional object with the additive manufacturing device, to pass a gas flow across the respective solidification point during the scanning. In this case, a beam bundle deflection center for which a directional component of the gas flow points from the solidification points to the projection center associated with the beam bundle deflection center is preferably selected for scanning the solidification points in the at least one section of an object cross-section.

In particular, in doing so, the angle between the direction of the gas flow and the connection line between the solidification point and the projection center can be selected to be smaller than 90°, preferably smaller than 45°, more preferably smaller than 30°. The optimal case would be when the gas flow points exactly towards the projection center.

As a result, it is possible to further improve the results achievable with the invention by additionally taking into accout the orientation of the gas flow.

Further preferably, a method according to the invention is carried out for a section which has at least one solidification point, during the scanning of which a beam bundle deflection angle exceeds a deflection minimum angle $\alpha 1$, wherein a beam bundle deflection angle is defined as an arctangent of the quotient of the distance of the solidification point from the projection center and the length of the projection line of the beam bundle deflection center, wherein the projection line of the beam bundle deflection center is a perpendicular to the build plane that connects the projection center to the beam bundle deflection center.

The more oblique the beam bundle impinges on the build plane, the more pronounced will be the deposition of impurities in a preferential direction. Therefore, for small beam bundle deflection angles, the procedure according to the invention can be rather dispensed with. To determine the deflection minimum angle $\alpha 1$, one can perform preliminary tests with the building material to be used and the beam parameters to be applied (e.g., laser power, beam diameter, etc.). In doing so, the deflection minimum angle $\alpha 1$ will also depend on the acceptable degree of inhomogeneities in the solidified building material in the object to be manufactured. Experience has shown that for most of the metal-containing powders used as building material, it will be possible to specify a deflection minimum angle $\alpha 1$ for usual requirements for component homogeneity, which angle is greater than or equal to 16°, preferably greater than or equal to 13°, further preferably greater than or equal to 10°, particularly preferably greater than or equal to 7.5°.

Further preferably, for scanning the building material along a trajectory, a beam bundle is used in each case whose beam bundle deflection angle $\alpha$ does not exceed a predetermined deflection maximum angle $\alpha 2$, wherein a beam bundle deflection angle is defined as the arctangent of the quotient of the distance of a solidification point from the projection center and the length of the projection line of the beam bundle deflection center, wherein the projection line of the beam bundle deflection center is a perpendicular to the build plane which connects the projection center with the beam bundle deflection center.

The described procedure is useful in cases where a plurality of beam bundle deflection centers are present. It is then possible to avoid increased one-sided deposition of impurities on the build plane when scanning the building material. Preferably, the deflection maximum angle $\alpha 2$ is identical to that deflection minimum angle $\alpha 1$ that, if exceeded, one should proceed with according to the invention.

Further preferably, different energy input parameter values are specified for a larger value of a beam bundle deflection angle $\alpha$ than for a smaller value of the beam bundle deflection angle $\alpha$, wherein a beam bundle deflection angle is defined as the arctangent of the quotient of the distance of a solidification point from the projection center and the length of the projection line of the beam bundle deflection center, wherein the projection line of the beam deflection center is a perpendicular to the build plane that connects the projection center with the beam bundle deflection center.

The inventors have found that by modifying the energy input parameters, e.g., laser power, deflection speed in scanning with the beam bundle, etc., the increased deposition of impurities on the build plane with increasing beam bundle deflection angle can be counteracted.

Further preferably, the number of changes from one beam bundle to another beam bundle during the scanning of the trajectories in the section is limited to a maximum value M.

In the case of scanning of a section with a plurality of beam bundles originating from different beam bundle deflection centers, a change from one beam bundle to another beam bundle is understood to be scanning of a first solidification point with a first beam bundle and scanning of a second solidification point located directly adjacent to the first solidification point with a second beam bundle. In particular, if an interruption of the scanning process with a first beam bundle and the continuation of the scanning process with a second beam bundle provides for an optimized direction of the movement vector during the scanning, then this can lead to a time extension of the scanning process, which is why the specification of a maximum value M for the number of changes can ensure that a desired production time of the object to be manufactured is not exceeded.

Further preferably, the maximum value M is defined as a function of specifications for a quality of the section and/or a production time of the object.

Preferably, specifications for a quality or homogeneity of the section and/or a production time of the object are made by means of an operator input at an input terminal, in particular a graphical user interface. This allows an operator to specify individually for an object to be manufactured which sections of an object cross-section must have a high degree of homogeneity and which specifications are made with regard to the building time (=production time).

In particular, it is possible for an operator to select one of n predefined successive quality or homogeneity levels for specifying the quality or homogeneity, using an operator input at an input terminal, in particular a graphical user interface. Here, n is a natural number greater than one and is preferably, but not necessarily, equal to the number of beam bundles or beam bundle deflection centers available for scanning a section. It is further assumed that the predetermined quality or homogeneity levels are subject to an order relation and are all different from each other. The specification of discrete homogeneity levels facilitates on the one hand the operability and on the other hand the adaptability of the method according to the invention to a given additive manufacturing device. Instead of the production time of the object, a production time of the section of the object cross-section can also be explicitly specified or selected from a spectrum of possible production times. The specified or selected production time directly influences the production time of the object.

Further preferably, the number of beam bundles is assigned to the trajectories in such a way that the maximum time difference between the time durations required for the laser beam bundles to scan their assigned solidification points within the section reaches a minimum.

In general, the beam bundle to be assigned to a trajectory or a section for scanning can be either randomly selected or else be selected according to a rule established in advance. In particular, the rule may depend on the value of a layer rotation angle when the orientation of the sub-areas in the build plane changes from layer to layer by a predetermined layer rotation angle. The rule may further depend on the specified maximum angles $\gamma 1$ and/or minimum angles $\gamma 2$ (these can also be chosen differently in the different layers).

Preferably, a method according to the invention is carried out for a section which is at least partially part of a bottom surface area of an object cross-section, wherein a bottom surface area is defined by in that no solidification of building material is specified in at least one of p layers below the bottom surface area, wherein p is a predetermined natural number, and/or is at least partially part of a top surface area of an object cross-section, wherein a top surface area is defined in that no solidification of building material is specified in at least one of q layers above the top surface area, wherein q is a predetermined natural number.

Especially in bottom surface areas and top surface areas, the achievement of a good surface quality is important, since these surfaces are visible from the outside. With this further development, a significant improvement in surface quality can already be observed for p=1 and q=1, but an influence on the solidification behavior can also be present if unsolidified building material is located in the layer after the next or in a layer even further away. However, effects on the quality of outer surfaces can already be observed if a value smaller than 5, preferably smaller than 10 or even smaller than 25, is selected for p and/or q. Specific values for the parameters p and q, by which it is specified when there is still an influence of unsolidified building material, can be determined depending on experience with a specific building material and a specific generative layer building device, e.g. after preliminary tests.

Further preferably, the method is carried out for a section which is at least partially part of a contour region of an object cross-section.

A contour region is an edge region of an object cross-section which, after completion of the object, forms part of the outer surface of the object and should therefore have a high quality. Usually, one tries to achieve a high quality by scanning the edge of the object cross-section in one go, if possible. According to this further development of the invention, it is differed from the conventional procedure by taking into account the position of the individual solidification points with respect to the projection center as described above when scanning the surface area. Thus, in particular, the direction of the movement vector with respect to the projection center and/or the order in which the parts of the contour region to be solidified are scanned relative to the projection center are taken into account. This can provide for improved surface quality. In doing so, the section can comprise not only a part of the contour region, but also the entire contour region.

In an additive manufacturing method according to the invention for manufacturing a three-dimensional object, wherein the object is manufactured using an additive manufacturing device by applying a building material layer upon layer and solidifying the building material in a build plane using an energy input device by supplying radiant energy to solidification points in each layer that are associated with the cross-section of the object in this layer by scanning these solidification points with a number of beam bundles provided by the energy input device along a plurality of trajectories in the build plane, the energy input device is controlled by a method for controlling an energy input device of an additive manufacturing device according to the invention.

In particular, the energy input device can have a number of laser sources from which laser beams are supplied to a number of scanners (in particular galvanometer scanners) as beam bundle deflection centers.

It is possible in the additive manufacturing process to pass a gas flow across the respective solidification point during scanning. In this case, it is advantageous if the manufacturing method is carried out such that, in the at least one section of an object cross-section, a directional component of the gas flow points from the solidification points to the projection center and/or is opposite to the direction of the movement vectors of the number of beam bundles.

In doing so, either the movement of beam bundles can be aligned with a predetermined direction of the gas flow or, if this is possible in the additive manufacturing device, the direction of the gas flow is adapted to the movement of the beam bundles.

In particular, the angle between the direction of the gas flow and the connection line between the solidification point and the projection center can be chosen to be smaller than 90°, preferably smaller than 45°, more preferably smaller than 30°. The optimal case would be when the gas flow points exactly towards the projection center.

Further, the angle between each of the movement vectors and the direction of the gas flow can be greater than 90°, preferably greater than 135°, more preferably greater than 150°. The optimal case would be if the direction of the gas flow were exactly opposite to that of the movement vectors.

As a result, it is possible to further improve the results achievable with the invention by a favorable choice of the orientation of the gas flow.

A device according to the invention for controlling an energy input device of an additive manufacturing device for manufacturing a three-dimensional object using the same,
  wherein the object is manufactured using the additive manufacturing device by applying a building material layer upon layer and solidifying the building material in a build plane using the energy input device by supplying radiant energy to solidification points in each layer associated with the cross-section of the object in this layer by scanning these solidification points along a plurality of trajectories in the build plane with a number of beam bundles provided by the energy input device,
  each of the number of beam bundles being assigned a beam bundle deflection center above the build plane from which this beam bundle is directed onto the build plane,
  comprises an assignment device that assigns to each beam bundle deflection center a projection center corresponding to a perpendicular projection of the position of the beam bundle deflection center onto the build plane, and
  a scanning control unit configured such that it defines, at least in a section of an object cross-section, the trajectories and the directions of the movement vectors of the number of beam bundles when scanning the trajectories such that at each of the solidification points in this section the movement vector has an angle with respect to a connection vector from this solidification point to the projection center of the beam bundle used, which angle is smaller than a predetermined maximum angle γ1.

The device for controlling an energy input device is capable of implementing the method described above for controlling an energy input device in which the direction of the movement vectors along the trajectories is defined. The individual components of the device, i.e. in particular the assignment device and the scanning control unit, can in this case be implemented by software alone or by hardware alone or by means of a mixture of hardware and software.

A further device according to the invention for controlling an energy input device of an additive manufacturing device for manufacturing a three-dimensional object using the same,
- wherein the object is manufactured using the additive manufacturing device by applying a building material layer upon layer and solidifying the building material in a build plane using the energy input device by supplying radiant energy to solidification points in each layer associated with the cross-section of the object in this layer by scanning these solidification points along a plurality of trajectories in the build plane with a number of beam bundles provided by the energy input device,
- wherein each of the number of beam bundles is associated with a beam bundle deflection center above the build plane from which the beam bundle is directed onto the build plane,
- comprises an assignment device which assigns to each beam bundle deflection center a projection center that corresponds to a perpendicular projection of the position of the beam bundle deflection center onto the build plane, and
- a scanning control unit configured such that it specifies a solidification of at least a section of an object cross-section, sub-area by sub-area, wherein in each sub-area the trajectories are substantially parallel to one another and in at least one of the sub-areas whose solidification points are scanned with a beam bundle associated with this sub-area, the order of scanning of the trajectories is defined such that trajectories located closer to the projection center of the beam bundle are scanned before trajectories located farther away from the projection center.

This device for controlling an energy input device is capable of implementing the above-described method for controlling an energy input device, in which the order of scanning the trajectories within a sub-area is defined. The individual components of the device, i.e. in particular the assignment device and the scanning control unit, can in this case be implemented by software alone or by hardware alone or by means of a mixture of hardware and software.

A further device according to the invention for controlling an energy input device of an additive manufacturing device for manufacturing a three-dimensional object using the same,
- wherein the object is manufactured using the additive manufacturing device by applying a building material layer upon layer and solidifying the building material in a build plane using the energy input device by supplying radiant energy to solidification points in each layer associated with the cross-section of the object in this layer by scanning these solidification points along a plurality of trajectories in the build plane with a number of beam bundles provided by the energy input device,
- wherein each of the number of beam bundles is associated with a beam bundle deflection center above the build plane from which this beam bundle is directed onto the build plane,
- comprises an assignment device that assigns to each beam bundle deflection center a projection center that corresponds to a perpendicular projection of the position of the beam bundle deflection center onto the build plane, and
- a scanning control unit configured such that it specifies a solidification of at least a section of an object cross-section, sub-area by sub-area, wherein the chronological order of scanning of sub-areas whose solidification points are scanned with a beam bundle assigned to these sub-areas is defined such that sub-areas located closer to the projection center of this beam bundle are scanned before sub-areas located farther away from the projection center.

This device for controlling an energy input device is capable of implementing the above-described method for controlling an energy input device in which the sequence of scanning of the sub-areas is specified. The individual components of the device, i.e. in particular the assignment device and the scanning control unit, can in this case be implemented by software alone or by hardware alone or by means of a mixture of hardware and software.

An additive manufacturing device according to the invention for manufacturing a three-dimensional object, wherein the object is manufactured using the additive manufacturing device by applying a building material layer upon layer and solidifying the building material in a build plane using an energy input device by supplying radiant energy to solidification points in each layer that are associated with the cross-section of the object in this layer by scanning these solidification points along a plurality of trajectories in the build plane with a number of beam bundles provided by the energy input device, the additive manufacturing device comprising:
- a layer application device configured to apply a layer of a building material to an already existing, preferably already selectively solidified, building material layer, and
- an energy input device configured to supply radiant energy to solidification points in each layer associated with the cross-section of the object in this layer by scanning these solidification points with a number of beam bundles provided by the energy input device along a plurality of trajectories in the build plane,
- wherein the additive manufacturing device comprises a device according to the invention for controlling an energy input device of an additive manufacturing device and/or is connected, in terms of signal technology, to a device according to the invention for controlling an energy input device of an additive manufacturing device.

In particular, the device for controlling an energy input device present in the additive manufacturing device can also be integrated into a control device that is present in the additive manufacturing device and controls an additive manufacturing process. In particular, the device for controlling an energy input device present in the additive manufacturing device can also be a computer program with which a CPU present in the control device is controlled. In this context, a connection in terms of signal technology means a connection by use of physical lines capable of transmitting control signals, or a radio link.

An object according to the invention, can be manufactured using an additive manufacturing method according to the invention.

BRIEF DESCRIPTION OF THE DRAWINGS

Further features and expediencies of the invention will be apparent from the description of exemplary embodiments with reference to the accompanying figures.

DETAILED DESCRIPTION OF THE EMBODIMENTS

Figure 1:
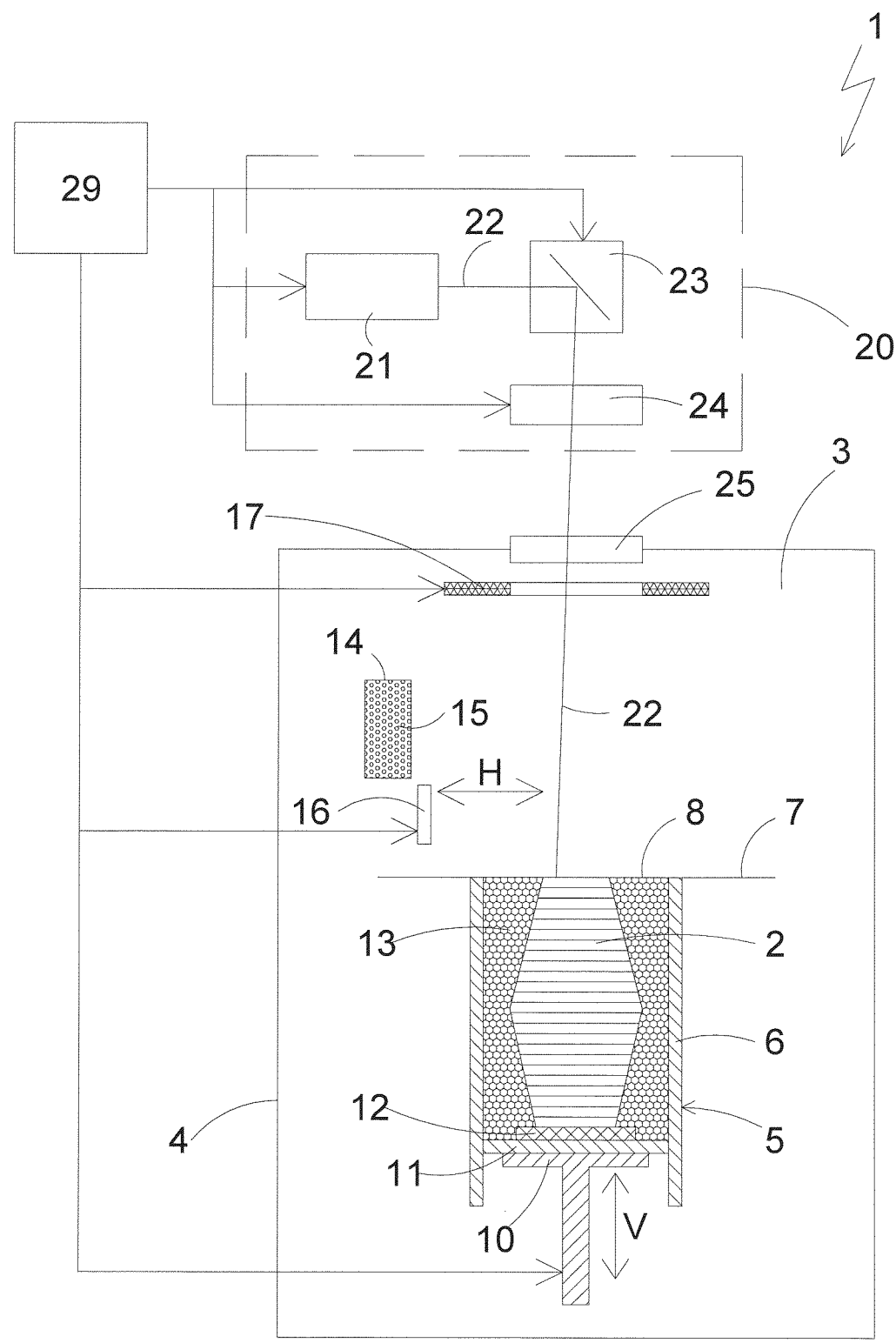
FIG. 1 shows a schematic view, partially in cross-section, of an exemplary device for additive manufacturing of a three-dimensional object according to the invention.

For a description of the invention, an additive manufacturing device according to the invention will first be described below with reference to FIG. 1 using the example of a laser sintering or laser melting device.

For building an object 2, the laser sintering or laser melting device 1 comprises a process chamber or build chamber 3 having a chamber wall 4. A building container 5 that is open to the top and has a container wall 6 is arranged in the process chamber 3. A working plane 7 (also referred to as a build plane) is defined by the upper opening of the building container 5, wherein the area of the working plane 7 located within the opening, which can be used for building the object 2, is referred to as the build area 8.

A support 10 movable in a vertical direction V is arranged in the building container 5, to which a base plate 11 is attached that closes the container to the bottom and thus forms its bottom. The base plate 11 can be a plate formed separately from the support 10 and attached to the support 10, or it can be formed integrally with the support 10. Depending on the powder and process used, a building platform 12 can also be attached to the base plate 11 as a building base on which the object 2 is built. However, the object 2 can also be built on the base plate 11 itself, which then serves as a building base. In FIG. 1, the object 2 to be formed in the container on the building platform 12 is shown below the working plane 7 in an intermediate state with several solidified layers surrounded by building material 13 that has remained unsolidified.

The laser sintering or laser melting device 1 further includes a storage container 14 for a building material 15, in this example a powder solidifiable by electromagnetic radiation, and a recoater 16 movable in a horizontal direction H for applying the building material 15 within the build area 8. Optionally, a heating device, for example a radiation heater 17, can be arranged in the process chamber 3 for heating the applied building material. For example, an infrared radiator can be provided as the radiation heater 17.

The exemplary additive manufacturing device 1 further includes an energy input device 20 with a laser 21, which generates a laser beam 22, which is deflected via a beam bundle deflection center 23, for example one or more galvanometer mirrors together with an associated drive, and is focused onto the working plane 7 by a focusing device 24 via a coupling window 25, which is provided on the upper side of the process chamber 3 in the chamber wall 4. In particular, it is also possible to provide a plurality of lasers and/or beam bundle deflection centers. This allows a manufacturing process to be carried out in a shorter time, since the building material can then be scanned and solidified at different points simultaneously using a plurality of beam bundles.

The specific structure of a laser sintering or laser melting device shown in FIG. 1 is therefore only exemplary for the present invention and can of course also be modified, in particular when using a different energy input device than the one shown. In order to mark that the area of the radiation impingement region on the building material need not necessarily be very small ("point-like"), the term "beam bundle" is also often used synonymously with "beam" in the present application.

The laser sintering device 1 further comprises a control device 29, via which the individual components of the device 1 are controlled in a coordinated manner for implementing the building process. Alternatively, the control device can be arranged partially or completely outside the additive manufacturing device. The control device can comprise a CPU whose operation is controlled by a computer program (software). The computer program can be stored separately from the additive manufacturing device in a storage device, from where it can be loaded (e.g., via a network) into the additive manufacturing device, in particular into the control device.

In operation, by means of the control device 29, the support 10 is lowered layer by layer, the recoater 16 is controlled to apply a new powder layer, and the energy input device 20, i.e. in particular the beam bundle deflection center 23 and optionally also the laser 21 and/or the focusing device 24, is controlled to solidify the respective layer at the locations corresponding to the respective object by scanning these locations with the laser. Herein, in the present application, reference is made to a unit 39 within the control device 29 that is responsible for controlling the energy input device 20 as a device 39 for controlling an energy input device. Nevertheless, it should be emphasized that a device for controlling an energy input device can also be present in the same way outside the control device 29 (also as a computer program), provided that it is ensured that the device 39 for controlling an energy input device for the additive manufacturing of objects can sufficiently interact with the control device 29, i.e. in particular can exchange signals.

Even if the invention mainly relates to laser sintering or laser melting methods or devices, an application to electron beam melting is also possible.

Figure 2:
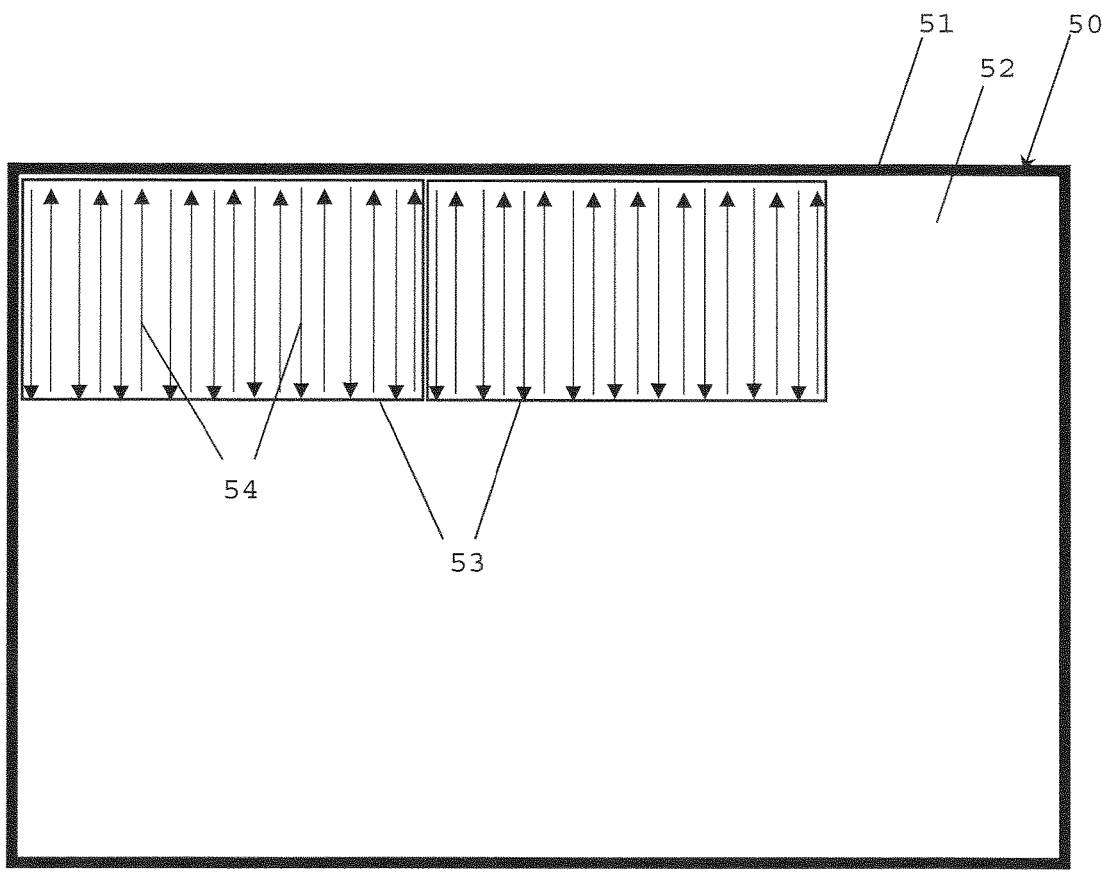
FIG. 2 schematically shows an example of the procedure according to the invention for a solidification of strip-shaped sub-areas of an object cross-section ("hatching").
Figure 13:
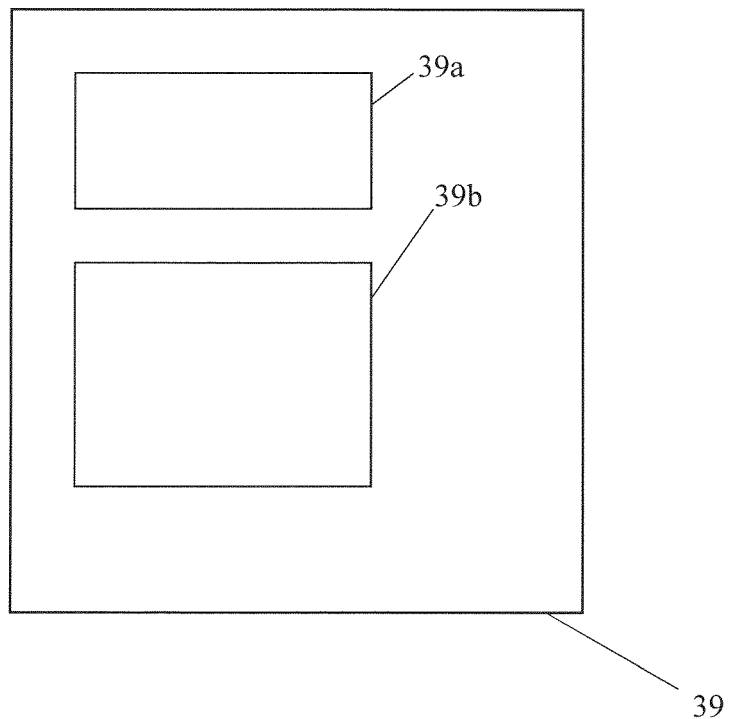
FIG. 13 shows the schematic structure of a device according to the invention for controlling an energy input device.

When controlling the energy input device, a solidification of locations of a building material layer is determined in a chronological order that corresponds to the movement of a beam bundle along a trajectory across the building material. In this regard, FIG. 13 shows a schematic structure of the aforementioned device 39 for controlling an energy input device, in which a scanning control unit 39b defines the chronological order, wherein FIG. 2 gives an example of the procedure. In FIG. 2, an object cross-section 50 to be solidified, which in this example has a rectangular shape, is subdivided into an inner region or core region 52 and a contour region 51, wherein different parameters for the energy input into the building material are generally assigned to the contour region 51 than to the inner region 52. For example, the contour region 51 is scanned with a laser beam (as an example of a beam bundle) in such a way that the trajectory runs along the contour. In this example, the inner region 52 is solidified in such a way that it is subdivided into sub-areas 53, which usually have an approximately rectangular or square shape and are therefore also referred to as "stripes" or "squares", and subsequently scanning of the building material is specified sub-area by sub-area. In doing so, in the example of FIG. 2, the laser beam is moved along parallel trajectories (hatch lines) 54 across the building material in each sub-area 53, resulting in a hatch-like movement pattern when scanning each sub-area 53 with the laser beam. This process is also referred to as "hatching" in technical jargon. In doing so, in FIG. 2, the movement direction of the laser beam along a trajectory is illustrated by an arrow.

According to the invention, the horizontal position of a beam bundle deflection center is taken into account when controlling the energy input device. In the device 39 for controlling an energy input device, an assignment device 39a is provided for this purpose. The procedure is explained below with reference to FIG. 3, which schematically shows a beam bundle deflection center 23 above the build area 8. By a perpendicular projection of the beam bundle deflection center 23 onto the build area 8 (or the build plane 7), a projection center 23' in the build plane 7 is assigned to the beam bundle deflection center 23. In this regard, as shown in the figure, a projection line 23k is a perpendicular to the build plane 7 that connects the projection center 23' with the beam bundle deflection center 23.

By defining the projection center 23', the procedure for scanning can be defined depending on the position of a point 64a, 64b, 64c to be solidified within the build area relative to the projection center 23', as will be explained below with reference to several examples.

First Exemplary Embodiment

According to the first exemplary embodiment, the device for controlling an energy input device selects the direction of the movement vector of the beam bundle for scanning a location to be solidified or solidification point in the build area 8 depending on the position of the solidification point relative to the projection center 23'. The procedure is explained below with reference to FIG. 4.

Figure 4:
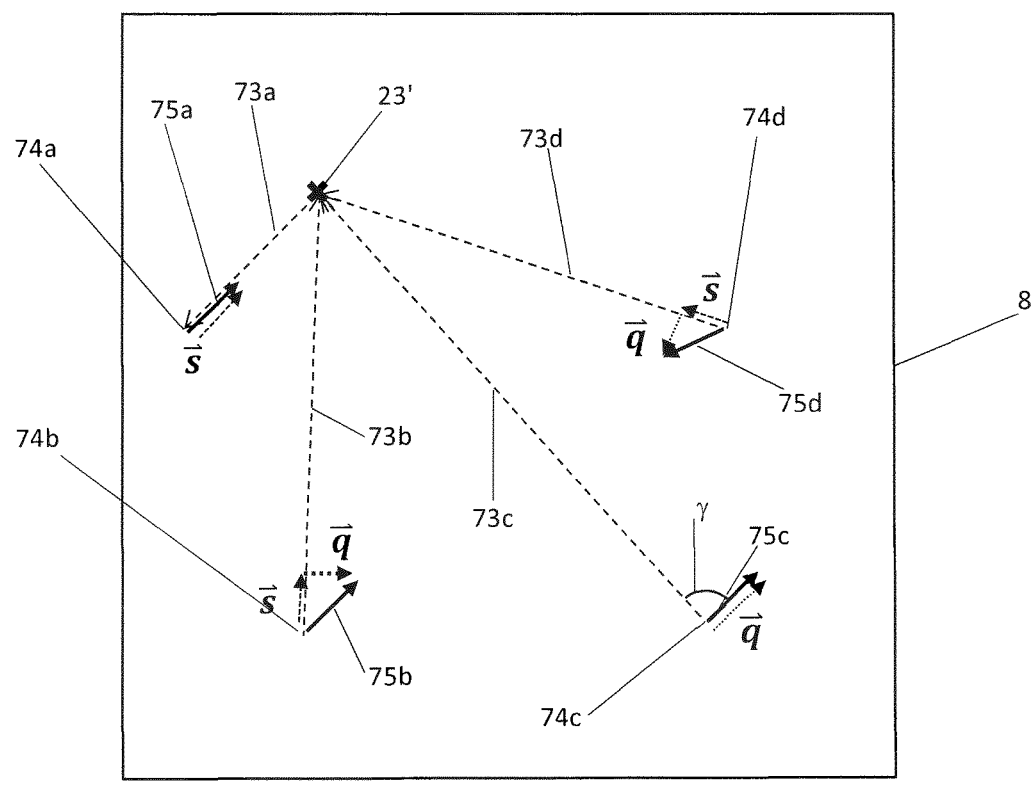
FIG. 4 shows an example of a procedure according to a first embodiment.

FIG. 4 shows a top view of the build area 8, in which the position of the projection center 23' of a beam bundle deflection center 23 as well as the positions of four exemplary solidification points 74a, 74b, 74c and 74d can be seen. Furthermore, the respective movement vectors 75a, 75b, 75c, and 75d are shown in the figure as the beam bundle originating from the beam bundle deflection center 23 moves across the solidification points 74a, 74b, 74c, and 74d.

As can be seen, the device for controlling an energy input device defines the direction of the movement vector at the locations 74a, 74b and 74d such that the movement vector has a component s pointing toward the projection center 23'. For a better illustration of the direction, a straight connection line 73a, 73b, 73c and 73d with the projection center 23' is drawn in dashed lines in FIG. 4 for each solidification point 74a, 74b, 74c and 74d, respectively.

It can further be seen in FIG. 4 that at the solidification point 74c, the movement vector is defined to have only a component q perpendicular to the connection line 73c. In this case, the movement vector 75c along a trajectory forms an angle γ of 90° with the connection line 73c.

The background for the described procedure is that the inventors found a deterioration of the object properties for the case in which the movement vector has a large component pointing away from the projection center. To this end, FIG. schematically shows the result of the investigations carried out in which a layer of a metal powder was applied in a conventional laser sintering device and then scanned with a laser beam bundle. For the investigation, the build area 8 was divided into sixteen square sections A to P, as shown in the upper part of FIG. 5, in which the position of the projection center 23' of the beam bundle deflection center 23 used for the scanning is also marked. Here, the scanning was performed according to the procedure described with reference to FIG. 2. Thus, different sub-areas 53 within a section were scanned in such a way that in each sub-area 53 the laser beam was moved along parallel trajectories (hatch lines) 54 across the building material.

The lower part of the figure shows a top view of section A after the described scanning. Sixteen sub-areas 53 can be seen within section A which, in contrast to FIG. 2, are not directly adjacent to one another. In each sub-area, an arrow indicates the direction in which the trajectories are proceeded with. Note that in each sub-area 53, the trajectories 54 parallel to each other are all passed in the same direction, i.e. the movement vectors point in the same direction in each case during scanning in a sub-area. Further, the depicted position of the arrow within each sub-area 53 indicates the position of the trajectory 54 scanned first within that sub-area. Finally, it should be noted that, for reasons of clarity, only two of the sixteen sub-areas are provided with the reference signs 53 and 54 in the figure.

The lower part of FIG. shows scanned sub-areas 53 with three different hatch densities and sub-areas 53 without hatching. The different densities of the hatch lines are intended to indicate the different properties of the solidified building material. In doing so, densely lying hatch lines indicate larger local variations of the solidified material volume in a sub-area 53 than less densely lying or even missing hatch lines in a sub-area 53. Missing hatch lines thus indicate the largest possible achieved homogeneity or the largest achieved volume percentage of solidified material in a sub-area 53. In particular, it can be seen that a different direction of the movement vector with respect to the projection center 23' leads to a different hatch density. The magnitude of the component of the movement vector pointing toward the projection center or away from the projection center also plays a role. The more strongly the movement vector is oriented toward the projection center or away from the projection center, the more pronounced is the effect to be observed.

Figure 5:
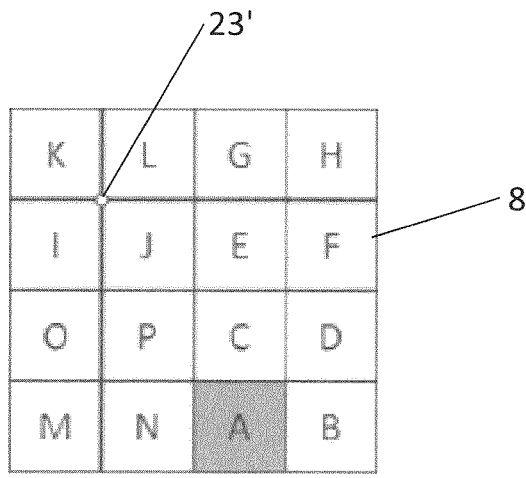
FIG. 5 schematically shows the result of investigations on the influence of the direction of movement of the beam bundle during scanning of the building material on the component quality.
Figure 5:
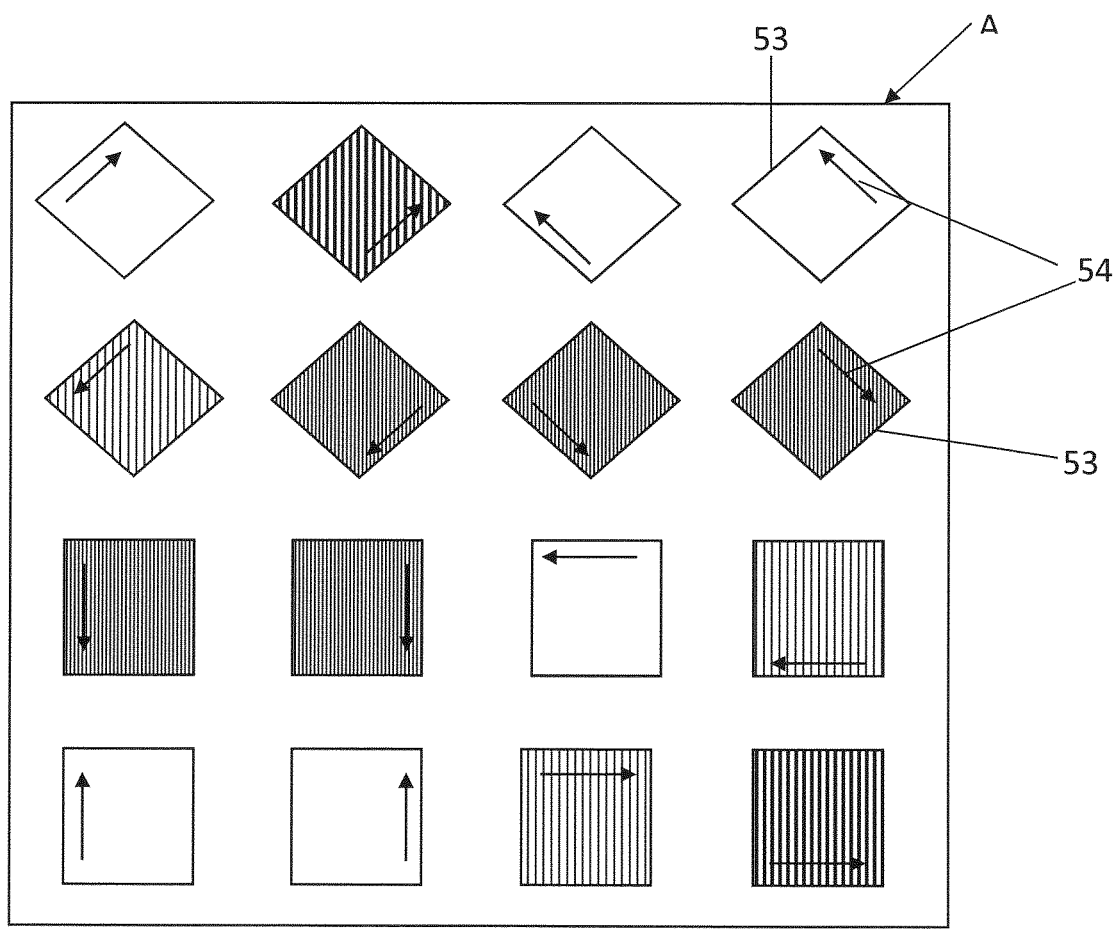

It should also be noted that the above investigation was carried out for different directions of a gas flow across the build area and a result was always obtained which corresponds to that of FIG. 5.

The above investigation makes it clear that when scanning the building material with a beam bundle, too large a directional component of the movement vector pointing away from the projection center should be avoided. Preferably, directional components of the movement vector pointing away from the projection center should be avoided at all. However, it may turn out in practice that due to other boundary conditions, e.g. a predefined production time for the manufacture of the object that is not to be exceeded, it is necessary to deviate from the preferred approach. In practice, therefore, it makes sense to adopt the described procedure at least when the trajectory to be scanned falls below a maximum angle γ1 with respect to the connection line to the projection center.

The inventors explain the observed behavior by the characteristics of the keyhole welding process used for melting the metal powder. In a keyhole welding process, such high temperatures are generated in the material that vaporization occurs and, in particular, radiation penetrates into a vapor capillary at the material surface. Multiple reflection at the edges of the vapor capillary then allows more energy in particular to be introduced into the material. The temporarily formed vapor capillary is usually referred to as a "keyhole". As explained below with reference to FIG. 9, the observed behavior can be explained by the fact that when the laser beam impinges on the building material at an angle, the keyhole forms differently depending on the direction of movement.

Figure 9A:
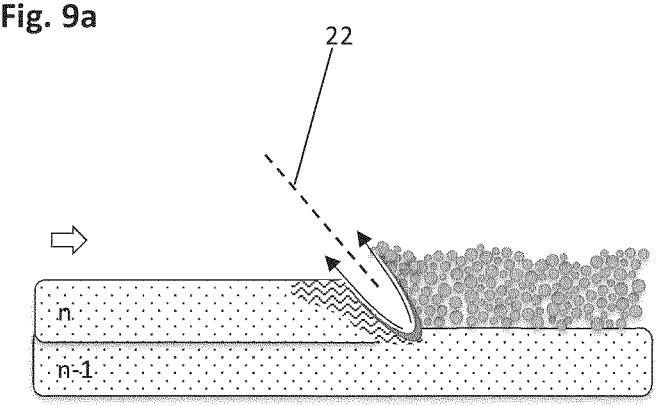
FIG. 9a and FIG. 9b each schematically show the impingement of a laser beam on the top layer of the building material for different inclinations of the beam bundle during the scanning process.
Figure 9B:
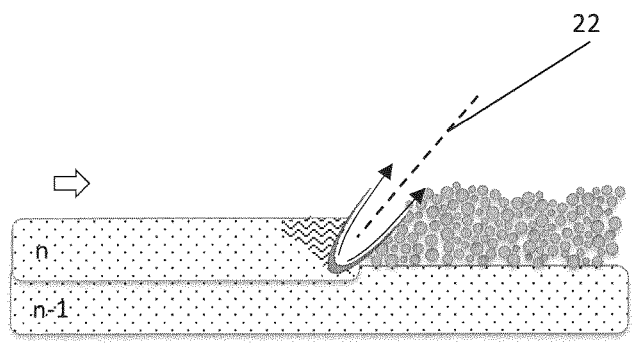

FIG. 9a and FIG. 9b, in accordance with the explanatory model, each schematically show the impingement of a laser beam on the metal powder used. In each case, the beam bundle is moved in a horizontal direction (from left to right in FIG. 9a and FIG. 9b), which is illustrated in each case by an arrow pointing to the right. Furthermore, in FIG. 9a and FIG. 9b the reference sign 22 illustrates the beam bundle, which is directed in each case from a beam bundle deflection center not shown onto the building material. While in FIG. 9a, when scanning the building material, the beam bundle moves away from the projection center of the beam bundle deflection center which is also not shown, in FIG. 9b the beam bundle moves toward the projection center when scanning the building material.

Both FIG. 9a and FIG. 9b schematically show the keyhole formed by the supplied radiant energy. This keyhole has approximately its largest dimension in the impingement direction of the beam bundle and consequently has an inclination relative to the vertical when the beam bundle impinges obliquely on the building material. As can be clearly seen in FIG. 9a, this undermines and displaces the powder material that has not yet solidified, whereas in FIG. 9b this does not occur in this way. As a result, the solidified layer in FIG. 9a shows poorer properties, in particular a partially reduced or strongly varying layer thickness, which is not shown in the schematic depiction of FIG. 9a.

While FIG. 9 exemplarily shows the situation in which the movement vector of the beam bundle exclusively has a directional component towards the projection center or away from the projection center, in practice there will usually also be a directional component perpendicular to the connection line of a solidification point with the projection center. Accordingly, if the directional component perpendicular to the connection line is sufficiently large, satisfactory results can also be obtained if a directional component pointing away from the projection center that is not too large is present, in other words, if the angle between the movement vector and the connection line to the projection center is less than a maximum angle.

As can be seen from the given explanation, when proceeding according to the invention, the most significant improvements in homogeneity will be obtained when a beam bundle impinges obliquely on the build plane. This is illustrated with reference to FIG. 10.

Figure 3:
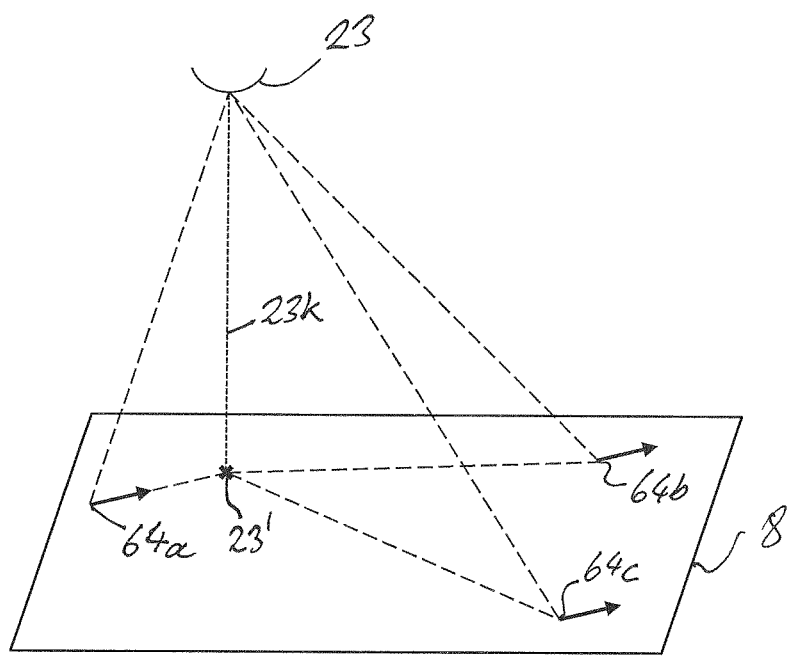
FIG. 3 illustrates the position of a beam bundle deflection center and of a projection center of the same with respect to solidification points in the build plane.
Figure 10:
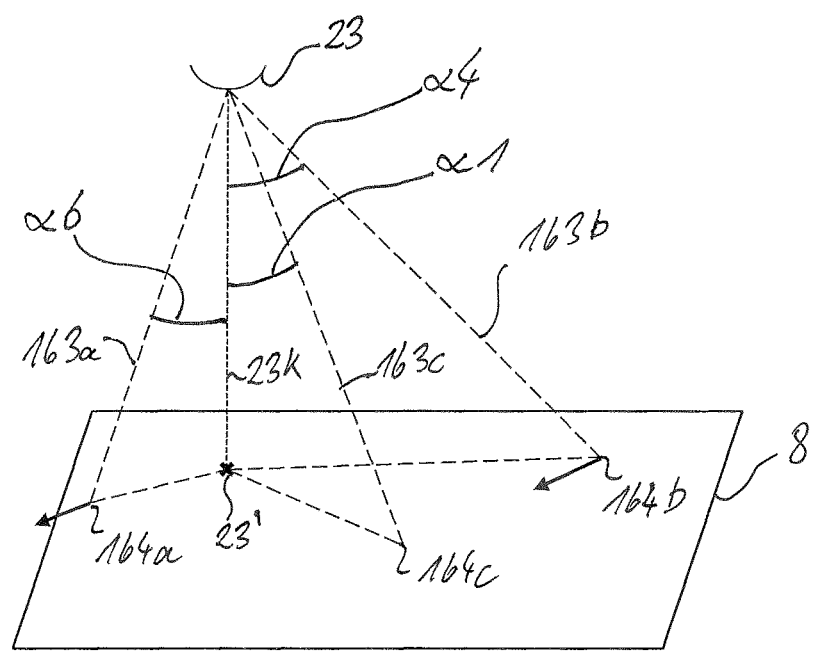
FIG. 10 illustrates a procedure in which the size of a beam bundle deflection angle is taken into account.

The view of FIG. 10 is very similar to the view of FIG. 3. In particular, the position of a beam bundle deflection center 23 above its associated projection center 23' in the build plane is shown, together with a schematic illustration of the directions 163a, 163b and 163c of a beam bundle when directed onto the solidification points 164a, 164b and 164c, respectively. The figure further shows a respective beam bundle deflection angle α6, α1 and α4 between the respective directions 163a, 163b and 163c, respectively, and the projection line 23k of the beam bundle deflection center 23. Here with the solidification point 164c is shown only for the purpose of illustrating a minimum deflection angle α1.

In the example of FIG. 10, when defining how to control the energy input device in an additive manufacturing device for scanning the solidification points 164a and 164b, the respective beam bundle deflection angle α6 or α4 is first compared to the deflection minimum angle α1. Since the beam bundle deflection angle α4 for the solidification point 164b is larger than the deflection minimum angle α1, the direction of the movement vector is set at the solidification point 164b such that a predetermined maximum angle between the movement vector and the connection line to the projection center is not reached. The beam bundle deflection angle α6 for the solidification point 164a is smaller than the deflection minimum angle α1. Therefore, at the solidification point 164a, a direction of the movement vector can be allowed to exceed the predetermined maximum angle between the movement vector and the connection line to the projection center.

Although it was mentioned above that the advantageousness of a procedure according to the first exemplary embodiment is exhibited independent of the orientation of a gas flow, which is passed, for example, across the build area, i.e. the locations to be solidified, as in WO 2014/125280 A2, this does not mean that the results cannot be further improved by additionally taking into account the orientation of the gas flow.

As already indicated above in connection with FIG. 9, it is disadvantageous if, when the laser radiation impinges on the building material, the latter is displaced in such a manner that it is deposited on the still unsolidified building material at points still to be solidified. Therefore, when a gas flow is passed across the points to be solidified during scanning, the movement vectors of the number of beam bundles 22 should be defined for scanning of the trajectories 54 such that a directional component of the gas flow is opposite to the direction of the movement vectors. In this manner, the gas flow counteracts deposits on material yet to be solidified. Alternatively, if the additive manufacturing device permits, the direction or orientation of the gas flow can also be adjusted.

Second Exemplary Embodiment

The second exemplary embodiment refers to the usual procedure of scanning the locations of a cross-section sub-area by sub-area explained above with reference to FIG. 2. According to the second exemplary embodiment, the order in which the trajectories (hatch lines) are scanned within each sub-area is defined by the device for controlling an energy input device depending on the position of the trajectories relative to the projection center. The procedure is explained below with reference to FIG. 6.

Figure 6:
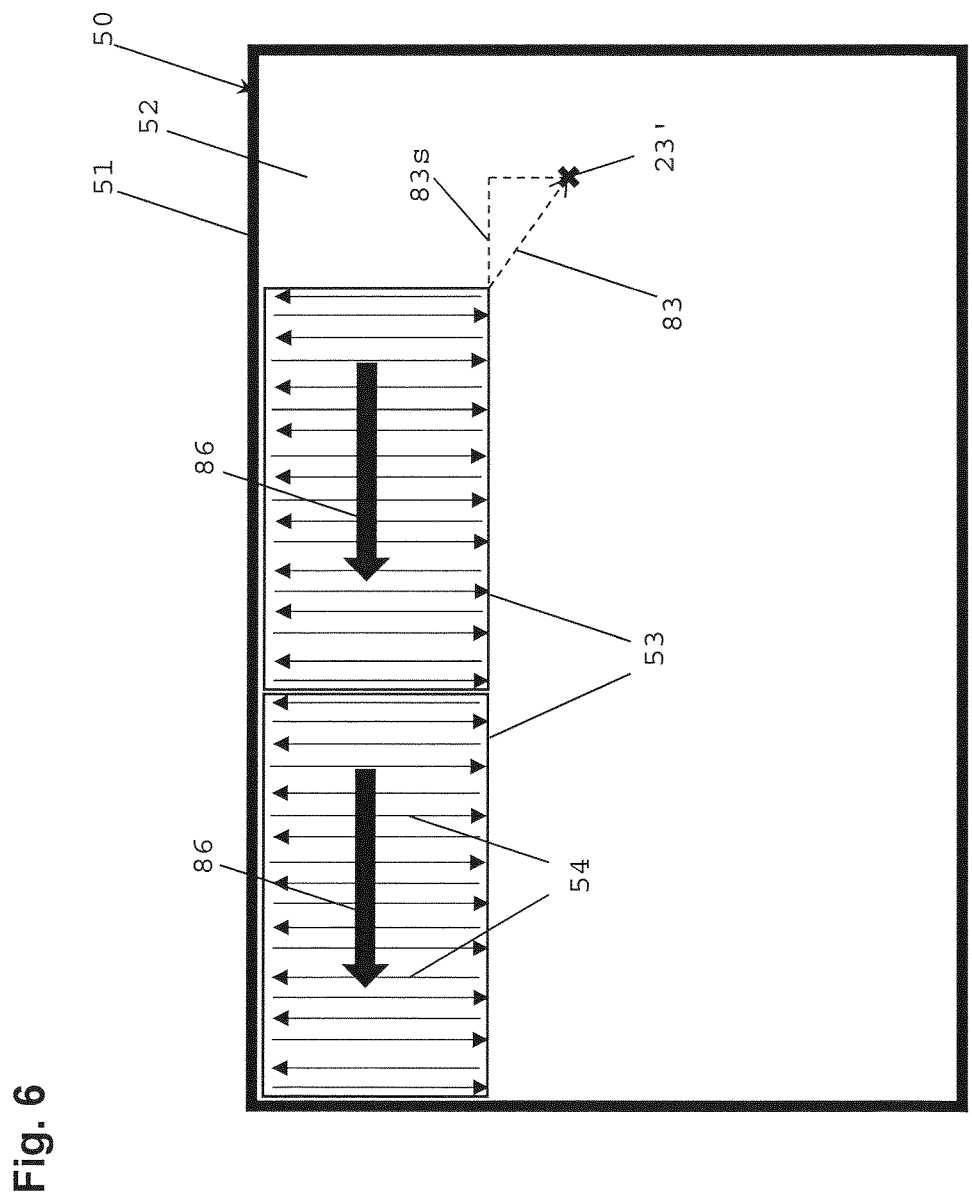
FIG. 6 shows an example of a procedure according to a second embodiment.

FIG. 6 is very similar to FIG. 2. In contrast to FIG. 2, the position of the projection center 23' relative to the sub-areas 53 is shown. Furthermore, in each sub-area 53, the chronological order in which the trajectories 54 in that sub-area are successively scanned is indicated in each case by an arrow depicting the trajectory processing direction 86. It can be seen that in FIG. 6, in each sub-area 53, the rightmost trajectory is scanned first, and then all other trajectories 54 are scanned in succession until the leftmost trajectory in the sub-area is scanned. In the example in FIG. 6, the order in which the trajectories are scanned one after the other is thus defined by the device for controlling an energy input device in such a way that trajectories having a short distance from the projection center are scanned before trajectories having a greater distance from the projection center.

An exemplary way to determine the distance of the trajectories within a sub-area 53 to the projection center 23' is to construct, for each of the trajectories 54 in the sub-area 53, a reference point connection vector 83 from the respective starting point of the trajectory to the projection center 23', and to determine the length of the component 83s of the connection vector that is perpendicular to the trajectory. A trajectory processing direction 86 perpendicular to the trajectories can then be determined for a substantially parallel alignment of the trajectories within a sub-area based on the lengths of the components 83s. As a result, trajectories located closer to the projection center 23' are scanned before trajectories that are farther away from the projection center 23'. Of course, another reference point on the trajectories may be selected instead of the starting point for the construction of the connection vector. However, in the case that not all trajectories within a sub-area are exactly parallel to each other and/or exactly the same length, it is advantageous to refer to the starting point or end point as the reference point.

The inventors were able to assess that with the described procedure a more homogeneous solidification of the building material could be achieved (recognizable, for example, by a lower surface roughness of the scanned regions) than when scanning the trajectories while ignoring the selected strategy. Here, too, an improvement could be achieved regardless of the direction of a gas flow present in each case. FIG. 7 schematically shows an exemplary result of the investigations carried out by the inventors with regard to the order with which the trajectories are scanned within a sub-area.

Figure 7A:
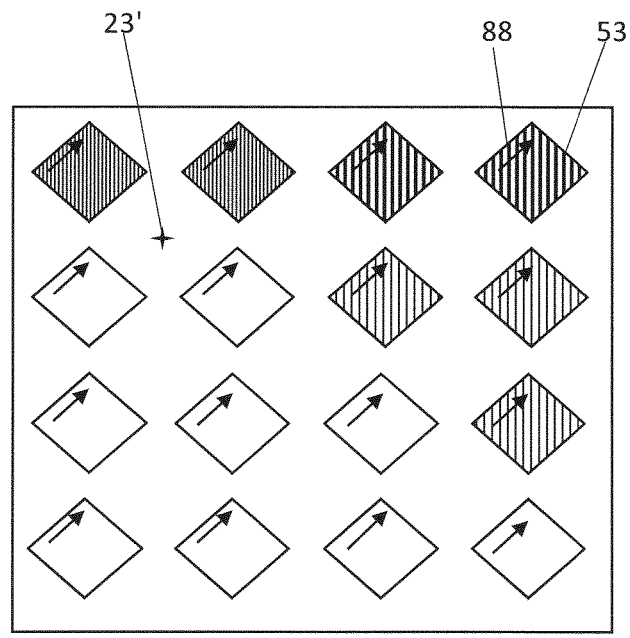
FIG. 7a and FIG. 7b schematically show the result of investigations regarding the order with which the trajectories are scanned within a sub-area.
Figure 7B:
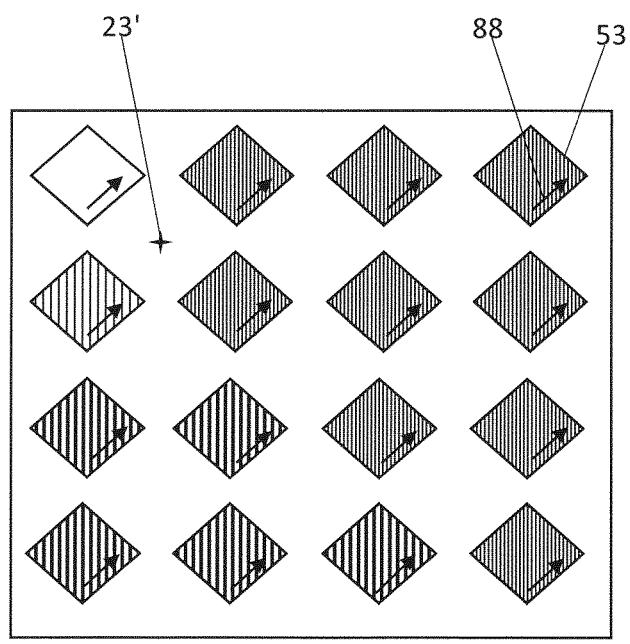

As in the investigation of FIG. 5, a layer of a metal powder was applied and then scanned with a laser beam bundle in a conventional laser sintering device. FIG. 7a and FIG. 7b each show a top view of a square section of the build area 8 after it has been scanned and the position of the projection center 23'. As in the lower part of FIG. 5, sixteen sub-areas 53 are visible, which, in contrast to FIG. 2, are not directly adjacent to one another. In each sub-area, an arrow 88 indicates the direction in which the trajectories are passed by the laser beam during scanning, wherein in all sub-areas 53 the mutually parallel trajectories are passed in the same direction, i.e. the movement vectors point in the same direction during scanning. For reasons of clarity, only one of the sixteen sub-areas is provided with a reference sign in each case in FIGS. 7a and 7b.

FIG. 7a and FIG. 7b differ in the position of the arrow indicating the scanning direction in the individual sub-areas. In FIG. 7a, this arrow 88 is arranged in each case at the upper left edge of the sub-areas 53, whereas in FIG. 7b the arrow is arranged in each case at the lower right edge of the sub-areas. The reason for the different arrangement is that both in FIG. 7a and in FIG. 7b the position of the arrow 88 is also intended to indicate the trajectory scanned first within a sub-area. Thus, in FIG. 7a, the trajectories in each sub-area 53 are scanned from upper left to lower right, whereas in FIG. 7b, the trajectories in each sub-area 53 are scanned from lower right to upper left.

Similar to the lower part of FIG. 5, FIG. 7 shows scanned sub-areas 53 with three different hatch densities as well as sub-areas 53 without hatching. The different densities of the hatch lines are intended to indicate the different quality achieved in the different sub-areas. More densely lying hatch lines in a sub-area 53 are intended to indicate a greater roughness of the surface compared to a sub-area 53 with less densely lying or even missing hatch lines. Missing hatch lines thus indicate surfaces with a very low roughness. In particular, it can be seen by comparing FIG. 7a and FIG. 7b that a higher quality (recognizable by the lower surface roughness) can be achieved if the direction in which the trajectories are successively scanned within a sub-area (trajectory processing direction) has a component that points away from the projection center 23'. This result could be observed regardless of the direction of a gas flow across the build area during scanning.

Furthermore, it can also be seen that an improvement is also achieved for those sub-areas 53 in which the movement vector of the beam bundle has a directional component pointing away from the projection center during scanning of the trajectories. This makes it clear that a procedure according to the second exemplary embodiment in itself, i.e. independent of the choice of the direction of the movement vector when scanning the individual trajectories, leads to an improved quality of the solidified areas. Accordingly, an improvement in homogeneity can also be achieved in the procedure illustrated in FIG. 6, although there the scanning direction (hatch direction) alternates in the sub-areas 53, i.e. every second trajectory has a directional component pointing away from the projection center 23'. If a particularly high homogeneity of the manufactured components is desired, then the procedures according to the first exemplary embodiment and according to the second exemplary embodiment should be combined with each other, which is easily possible.

Figure 12A:
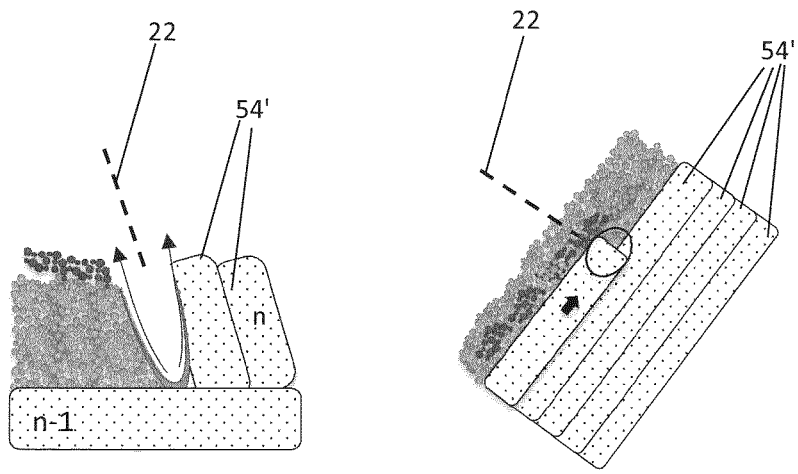
FIG. 12a and FIG. 12b each schematically show the procedures during melting the building material for different trajectory order directions.
Figure 12B:
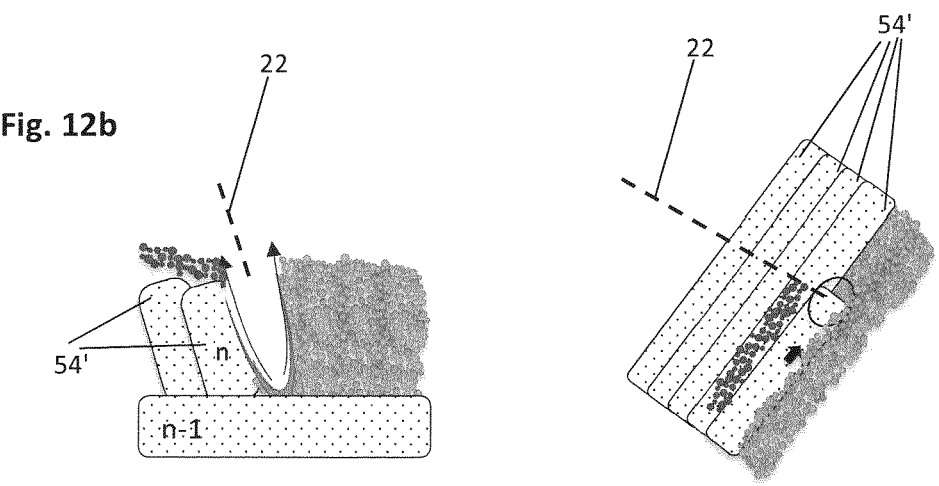

A possible explanation of the observed behavior is given with reference to FIG. 12. Similar to FIG. 9, FIG. 12 shows the position of a keyhole formed when a beam bundle impinges onto the pulverulent building material. In contrast to FIG. 9, however, the beam bundle moves perpendicular to the connection line from the respective solidification point to the projection center. Thus, in the left half of FIGS. 12a and 12b, in each case a section through the keyhole and two adjacent solidification paths 54' perpendicular to the movement direction of the beam bundle is shown, i.e., the movement direction of the beam bundle is perpendicular to the plane of the drawing sheet. The difference between FIG. 12a and FIG. 12b is that in FIG. 12a the keyhole is inclined towards the unsolidified powder material, whereas in FIG. 12b the keyhole is inclined towards the two solidification paths 54' with already solidified building material. In the right half of FIGS. 12a and 12b, a top view of a layer to be currently solidified is shown in each case. From this top view it can be seen that in FIG. 12*a* the trajectory processing direction points towards the projection center 23' (not shown), whereas in FIG. 12*b* the trajectory processing direction points away from the projection center 23'.

In FIG. 12 (as in FIG. 9), the displacement of material from the keyhole is illustrated by means of two arrows on either side of the respective keyhole. It can be seen that in FIG. 12*a* material from the keyhole is deposited on the not yet solidified pulverulent building material, whereas in FIG. 12*b* material from the keyhole is deposited on the solidification paths 54'. Accordingly, in the situation of FIG. 12*a*, the melting process is impaired when scanning the subsequent adjacent trajectory, resulting in a deteriorated quality, e.g., a rougher surface of the associated solidification path.

Similar to the first exemplary embodiment, it may turn out in practice that it is necessary to deviate from the procedure according to the second exemplary embodiment due to other boundary conditions, e.g., a predetermined production time for the manufacture of the object that is not to be exceeded. In such a case, a procedure according to the second exemplary embodiment can be carried out only in those sub-areas in which a movement vector when scanning a trajectory within the sub-area has an angle with respect to the connection line to the projection center, which angle exceeds a minimum angle $\gamma 2$. This is illustrated with reference to FIG. 11.

Figure 11:
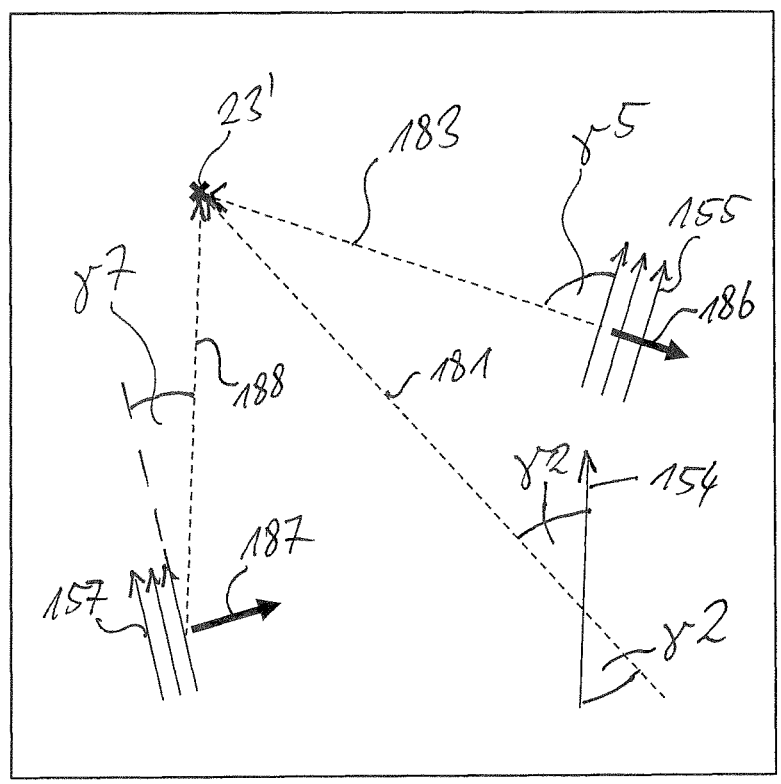
FIG. 11 shows an example of a variant of the procedure according to a second embodiment.

FIG. 11 schematically shows a top view of the build area 8, in which the position of a projection center 23' relative to trajectories 154, 155 and 157 in different sub-areas is shown. The connection vector 181 to the projection center 23' forms an angle $\gamma 2$ with a movement vector along the exemplary trajectory 154, which angle in the example of FIG. 11 is defined as a minimum angle.

With such a definition of a minimum angle $\gamma 2$, the trajectory processing direction 186 is defined for the trajectories 155 in such a way that trajectories located closer to the projection center 23' are scanned before trajectories located further away from the projection center 23'. The reason is that when the parallel trajectories 155 are scanned, an angle $\gamma 5$ between the direction of the movement vector and the respective connection vector 183 to the projection center 23' is larger than the minimum angle $\gamma 2$. The movement vectors along the parallel trajectories 157 form an angle $\gamma 7$ with the respective connection vector 188, which angle is smaller than the minimum angle $\gamma 2$. Accordingly, a trajectory processing direction 187 can be allowed for the trajectories 157, in which trajectories located closer to the projection center 23' are scanned after trajectories located further away from the projection center 23'.

Also in the second exemplary embodiment, when proceeding according to the invention, the most significant improvements in homogeneity will be obtained for an oblique impingement of the beam bundle on the build plane. In other words, for a sufficiently perpendicular impingement of the beam bundle, it may be possible to dispense with a procedure described in the second exemplary embodiment if the accuracy requirements are not so high. The procedure illustrated with reference to FIG. 10 depending on the beam bundle deflection angle can therefore be applied in the same way in connection with the second exemplary embodiment.

Similar to the first exemplary embodiment, the results can be further improved if an orientation of the gas flow is additionally taken into account.

As already mentioned above in connection with FIG. 12*a*, it is disadvantageous if, when the laser radiation impinges on the building material, material is displaced from the keyhole in such a way that it is deposited on building material that is not yet solidifed at points that are yet to be solidified. Therefore, if during scanning a gas flow is passed across the locations to be solidified, the trajectory processing direction should not only be selected to point away from the projection center 23', but a beam bundle deflection center 23 should also be selected for the solidification whose associated projection center 23' has a position that results in a directional component of the gas flow during scanning of a solidification point pointing toward the projection center 23. In this way, the gas flow counteracts deposits on material yet to be solidified. Alternatively, if the additive manufacturing device permits this, the direction or orientation of the gas flow can also be adjusted.

Third Exemplary Embodiment

The third exemplary embodiment, like the second exemplary embodiment, refers to the usual procedure of scanning the locations of a cross-section sub-area by sub-area explained above with reference to FIG. 2. According to the third exemplary embodiment, the order in which the sub-areas are scanned one after the other is defined by the device for controlling an energy input device depending on the position of the sub-areas relative to the projection center. The procedure is explained below with reference to FIG. 8.

Figure 8:
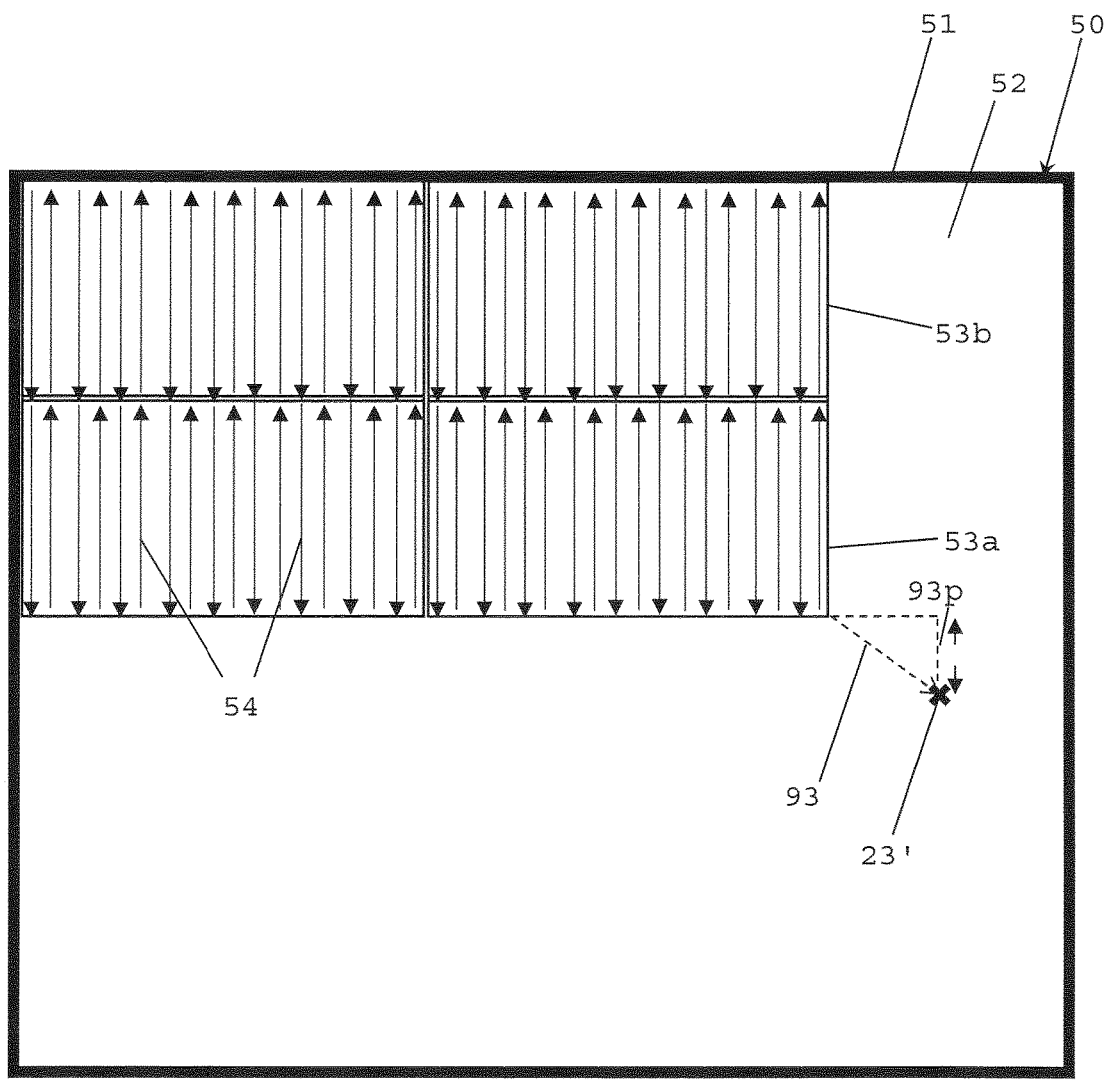
FIG. 8 shows an example of a procedure according to a third embodiment.

FIG. 8 is very similar to FIG. 6, but the trajectory processing direction 86 in the sub-areas is not specifically indicated by an arrow. In FIG. 8, the two sub-areas marked with the reference signs 53*a* and 53*b* are distinguished from each other by the appended lower case letter. This is intended to express that the sub-area 53*a* is scanned before the sub-area 53*b*, since it has a smaller distance to the projection center 23'.

An exemplary way of taking into account the distance between a sub-area and the projection center is to determine the minimum distance to the projection center for each sub-area and to scan the sub-areas with increasing size of the minimum distances, i.e. to first scan the sub-area with the smallest minimum distance and to scan the sub-area with the largest minimum distance last. In FIG. 8, the minimum distance between the sub-area 53*a* and the projection center 23' is indicated by a connection vector or a straight connection line 93.

Of course, the distance between a sub-area and the projection center can also be determined in other ways. For example, instead of defining the length of the shortest connection line between a sub-area and the projection center as the distance, as just described, one could define the component of the shortest connection line that is perpendicular to the trajectories within the sub-area. A corresponding distance is indicated in FIG. 8 with the reference sign 93*p*.

Also for a procedure according to the third exemplary embodiment, the inventors were able to establish that a more homogeneous solidification of the building material can be achieved than in comparison to a non-observance of the just described preferred chronological order for the scanning of the sub-areas one after the other. Again, an improvement could be achieved regardless of the direction of a gas flow present in each case.

As in the case of the second exemplary embodiment, it is possible, in particular if further boundary conditions are present, e.g. a predetermined production time for the manufacture of the object which is not to be exceeded, to restrict a procedure in accordance with the third exemplary embodiment to those sub-areas in which the trajectories to be scanned have an angle with respect to the connection line to the projection center which angle exceeds a minimum angle γ2. The above explanations in connection with FIG. 11 can be applied analogously to the third exemplary embodiment.

Also in the third exemplary embodiment, when proceeding according to the invention, the most significant improvements in homogeneity will be achieved for an oblique impingement of the beam bundle onto the build plane. In other words, for a sufficiently perpendicular impingement of the beam bundle, it may be possible to dispense with a procedure described in the third exemplary embodiment if the accuracy requirements are not so high. The procedure illustrated with reference to FIG. 10 depending on the beam bundle deflection angle can be applied in the same way in connection with the third exemplary embodiment.

Similar to the second exemplary embodiment, the results can be further improved if an orientation of the gas flow is additionally taken into account.

According to the third exemplary embodiment, the homogeneity of the properties of the manufactured objects is improved by scanning sub-areas that are located closer to the projection center 23' of the beam bundle 22 before sub-areas that are located further away from the projection center 23'. In this case, too, it is to be avoided that by the scanning material is deposited on building material that is not yet solidified.

Therefore, if a gas flow is passed across the locations to be solidified during the scanning, a beam bundle deflection center 23 should be selected for the solidification the associated projection center 23' of which has a position that results in a directional component of the gas flow pointing from the solidification points in the sub-areas during scanning in the direction of the projection center 23. In this way, the gas flow counteracts deposits on material yet to be solidified. Alternatively, if the additive manufacturing device permits this, the direction or orientation of the gas flow can also be adjusted.

The procedures described in the first, second and third exemplary embodiments, including their modifications, can be combined with each other as desired. The greatest homogeneity of the properties of an additively manufactured object is achieved in a procedure which simultaneously implements the teachings of all three exemplary embodiments when controlling an energy input device. Finally, it should be noted that the maximum angle γ1 described above and the minimum angle γ2 described above do not have to be chosen symmetrically with respect to the connection vector from a solidification point to the projection center. Rather, different values can be specified for the maximum angle γ1 and/or the minimum angle γ2 for movement vectors located on different sides of the connection vector.

The invention claimed is:

1. A method for controlling an energy input device of an additive manufacturing device for manufacturing a three-dimensional object, the method comprising:
　applying a building material layer upon layer using the additive manufacturing device; and
　solidifying the building material in a build plane using the energy input device by supplying radiant energy to solidification points in each layer by scanning a cross-section of the three-dimensional object with a number of beam bundles provided by the energy input device along a plurality of trajectories in the build plane, wherein at least one section of the cross-section is solidified, sub-area by sub-area, wherein each of the number of beam bundles is assigned a beam bundle deflection center above the build plane, the beam bundle deflection center defining a location from which the beam bundle is directed onto the build plane, each beam bundle deflection center being assigned a projection center that corresponds to a perpendicular projection of a position of the beam bundle deflection center onto the build plane;
　defining an order of scanning of the trajectories in at least one of the sub-areas having solidification points scanned with a beam bundle assigned to the respective sub-area, wherein the defined order allows for the respective beam bundle to scan trajectories that are located closer to the projection center of the beam bundle before trajectories that are located further away from the projection center, and
　defining a chronological order of scanning of sub-areas having the solidification points scanned with beam bundles assigned to the sub-areas, wherein the defined chronological order allows for the beam bundle to scan sub-areas that are located closer to the projection center of the beam bundle before sub-areas that are located further away from the projection center.

2. The method of claim 1, wherein in a sub-area in which the trajectories run substantially parallel to one another and the trajectories are scanned in the defined order, a movement vector of at least one solidification point has an angle with respect to a connection vector from the solidification point to the projection center of the beam bundle used, wherein the angle is greater than a predetermined minimum angle.

3. The method of claim 1, further comprising passing a gas flow across a respective solidification point during scanning; and
　selecting the beam bundle deflection center for which a directional component of the gas flow points from the solidification points to the projection center associated with the beam bundle deflection center for scanning the solidification points in the at least one of the sub-areas.

4. A method for controlling an energy input device of an additive manufacturing device for manufacturing a three-dimensional object using the same,
　wherein the object is manufactured using the additive manufacturing device by applying a building material layer upon layer and solidifying the building material in a build plane using the energy input device by supplying radiant energy to solidification points in each layer which are assigned to the cross-section of the object in this layer, by scanning these solidification points with a number of beam bundles provided by the energy input device along a plurality of trajectories in the build plane,
　each of the number of beam bundles being assigned a beam bundle deflection center above the build plane, from which the beam bundle is directed onto the build plane,
　wherein each beam bundle deflection center is assigned a projection center that corresponds to a perpendicular projection of the position of the beam bundle deflection center onto the build plane,
　wherein at least one section of an object cross-section is solidified, sub-area by sub-area, wherein the chronological order of scanning of sub-areas, whose solidification points are scanned with a beam bundle assigned to these sub-areas, is defined such that sub-areas that are located closer to the projection center of the beam bundle are scanned before sub-areas that are located further away from the projection center.

5. The method according to claim 4, in which the section has a plurality of sub-areas that have a rectangular shape in a plan view of the build plane, the trajectories in the section being substantially parallel to one another and substantially parallel to the transverse sides of the sub-areas, wherein the length of a perpendicular from the projection center to a straight line running through a sub-area parallel to a long side is used as a measure for the distance of a sub-area from the projection center.

6. The method according to claim 4, in which, during the manufacture of a three-dimensional object with the additive manufacturing device, a gas flow is passed across the respective solidification point during scanning,
wherein, for the scanning of the solidification points in the at least one section of an object cross-section, a beam bundle deflection center is selected for which a directional component of the gas flow points from the solidification points to the projection center assigned to the beam bundle deflection center.

7. The method of claim 1, wherein a beam bundle deflection angle exceeds a deflection minimum angle during scanning of the sub-area having at least one solidification point, wherein the beam bundle deflection angle is defined as an arctangent of a quotient of a distance of the solidification point from the projection center and a length of a projection line of the beam bundle deflection center, wherein the projection line of the beam bundle deflection center is-a perpendicular to the build plane that connects the projection center with the beam bundle deflection center.

8. The method of claim 1, wherein a respective beam bundle is used for scanning the building material along a trajectory, wherein a beam bundle deflection angle does not exceed a predetermined deflection maximum angle, wherein the beam bundle deflection angle is defined as an arctangent of a quotient of a distance of a solidification point from the projection center and a length of a projection line of the beam bundle deflection center, wherein the projection line of the beam bundle deflection center is a perpendicular to the build plane that connects the projection center with the beam bundle deflection center.

9. The method of claim 1, wherein different energy input parameter values are specified for a larger value of a beam bundle deflection angle than for a smaller value of the beam bundle deflection angle, wherein the beam bundle deflection angle is defined as an arctangent of a quotient of a distance of a solidification point from the projection center and a length of a projection line of the beam bundle deflection center, wherein the projection line of the beam bundle deflection center is perpendicular to the build plane that connects the projection center with the beam bundle deflection center.

10. The method of claim 8, wherein a number of changes from one beam bundle to another beam bundle during scanning of the trajectories in the sub-area is limited to a maximum value.

11. The method of claim 10, wherein the maximum value is defined as a function of specifications for a quality of the sub-area or a production time of the object.

12. The method of claim 1, wherein the sub-area is at least a part of a bottom surface area of the cross-section, wherein the bottom surface area is defined in that no solidification of building material is specified in at least one of p layers below the bottom surface area, wherein p is a predetermined natural number, or wherein the sub-area is at least a part of a top surface area of the cross-section, wherein the top surface area is defined in that no solidification of building material is specified in at least one of q layers above the top surface area, wherein q is a predetermined natural number.

13. The method of claim 1, wherein the sub-area is at least a part of a contour region of the cross-section.

14. An additive manufacturing method for manufacturing a three-dimensional object, the method comprising:
applying a building material layer upon layer using the additive manufacturing device; and
solidifying the building material in a build plane using an energy input device by supplying radiant energy to solidification points in each layer,
wherein the solidification points are assigned to the layer, by scanning a cross-section of the three-dimensional object with a number of beam bundles provided by the energy input device along a plurality of trajectories in the build plane,
wherein the energy input device is controlled by the method of claim 1.

* * * * *